(12) United States Patent
Kidokoro et al.

(10) Patent No.: US 9,995,197 B2
(45) Date of Patent: Jun. 12, 2018

(54) AMMONIA ADSORPTION AMOUNT ESTIMATION APPARATUS, AMMONIA ADSORPTION AMOUNT ESTIMATION METHOD, AND EXHAUST GAS PURIFICATION SYSTEM FOR INTERNAL COMBUSTION ENGINE

(71) Applicant: TOYOTA JIDOSHA KABUSHIKI KAISHA, Toyota-shi, Aichi-ken (JP)

(72) Inventors: Toru Kidokoro, Hadano (JP); Makoto Ogiso, Mishima (JP); Yuriko Hagimoto, Susono (JP); Takeru Shirasawa, Susono (JP); Ryohei Ohno, Susono (JP); Kenji Furui, Sunto-gun (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 31 days.

(21) Appl. No.: 15/358,542

(22) Filed: Nov. 22, 2016

(65) Prior Publication Data

US 2017/0145893 A1 May 25, 2017

(30) Foreign Application Priority Data

Nov. 25, 2015 (JP) .................................. 2015-230007

(51) Int. Cl.
*F01N 11/00* (2006.01)
*B01D 53/94* (2006.01)
(Continued)

(52) U.S. Cl.
CPC .......... *F01N 11/00* (2013.01); *B01D 46/0036* (2013.01); *B01D 53/9418* (2013.01);
(Continued)

(58) Field of Classification Search
None
See application file for complete search history.

(56) References Cited

U.S. PATENT DOCUMENTS 6,755,014 B2 * 6/2004 Kawai ................ B01D 53/9495
60/286

FOREIGN PATENT DOCUMENTS

| JP | 2001-193440 | 7/2001 |
| JP | 2009-293606 | 12/2009 |
| JP | 2012-154229 | 8/2012 |

OTHER PUBLICATIONS

Friedemann Schrade, et al., "Physico-Chemical Modeling of an Integrated SCR on DPF (SCR/DPF) Systems", *SAE International Journal of Engines*, Aug. 2012, vol. 5, No. 3, pp. 958-974.

* cited by examiner

*Primary Examiner* — Walter D. Griffin
*Assistant Examiner* — Jelitza M Perez
(74) *Attorney, Agent, or Firm* — Finnegan, Henderson, Farabow, Garrett & Dunner, LLP

(57) ABSTRACT

Embodiments of the present disclosure may estimate the amount of ammonia adsorbed in an SCR catalyst as accurately as possible. The ammonia adsorption amount is calculated by integrating the quantity of ammonia supplied to the SCR filter, the quantity of ammonia consumed in reduction of NOx in the SCR catalyst, and the quantity of ammonia desorbed from the SCR catalyst. In the calculation, a differential pressure change rate defined as the increase in a converted differential pressure value per unit increase in the filter PM deposition amount is referred to. The ammonia desorption quantity is calculated in such a way that the calculated value of the ammonia desorption quantity is made smaller when the differential pressure change rate is smaller than a predetermined threshold than when the differential (Continued)

pressure change rate is equal to or higher than the predetermined threshold.

4 Claims, 13 Drawing Sheets

(51) Int. Cl.
*B01D 46/00* (2006.01)
*F01N 3/035* (2006.01)
*F01N 3/20* (2006.01)
*B01D 46/44* (2006.01)

(52) U.S. Cl.
CPC ..... *B01D 53/9431* (2013.01); *B01D 53/9495* (2013.01); *F01N 3/035* (2013.01); *F01N 3/208* (2013.01); *F01N 3/2066* (2013.01); *F01N 11/002* (2013.01); *B01D 46/448* (2013.01); *B01D 2251/2062* (2013.01); *B01D 2255/911* (2013.01); *B01D 2258/012* (2013.01); *B01D 2279/30* (2013.01); *F01N 2550/05* (2013.01); *F01N 2610/02* (2013.01); *F01N 2900/0418* (2013.01); *F01N 2900/0601* (2013.01); *F01N 2900/1602* (2013.01); *F01N 2900/1622* (2013.01); *F01N 2900/1812* (2013.01); *Y02T 10/24* (2013.01); *Y02T 10/47* (2013.01)

AMMONIA ADSORPTION AMOUNT
ESTIMATION APPARATUS, AMMONIA
ADSORPTION AMOUNT ESTIMATION
METHOD, AND EXHAUST GAS
PURIFICATION SYSTEM FOR INTERNAL
COMBUSTION ENGINE

TECHNICAL FIELD

The present disclosure relates to an ammonia adsorption amount estimation apparatus and an ammonia adsorption amount estimation method for estimating the amount of ammonia adsorbed in an SCR catalyst in an SCR filter provided in an exhaust passage of an internal combustion engine. The present disclosure also relates to an exhaust gas purification system for an internal combustion engine equipped with an SCR filter.

BACKGROUND ART

It is known in a prior art to provide an SCR filter made up of a filter and an SCR catalyst (selective catalytic reduction NOx catalyst) supported on the filter in an exhaust passage of an internal combustion engine. The SCR catalyst has the capability of reducing NOx in the exhaust gas using ammonia as a reducing agent. The filter has the function of trapping particulate matter (which will be hereinafter referred to as PM) in the exhaust gas.

Patent Literature 1 discloses a technology pertaining to an exhaust gas purification system including an SCR catalyst provided in an exhaust passage of an internal combustion engine. Patent Literature 1 teaches to estimate the ammonia adsorption amount defined as the amount of ammonia adsorbed in the SCR catalyst and to adjust the quantity of reducing agent supplied to the SCR catalyst on the basis of the difference between the estimated ammonia adsorption amount and a target adsorption amount. By this technology, it is possible to reduce the quantity of ammonia flowing out of the SCR catalyst while keeping the NOx removal rate of the SCR catalyst (i.e. the rate of the quantity of NOx reduced by the SCR catalyst to the quantity of NOx flowing into the SCR catalyst) high.

Patent Literature 2 discloses a technology pertaining to an exhaust gas purification system including an SCR catalyst provided in an exhaust passage of an internal combustion engine at a location downstream of a filter. Patent Literature 2 teaches to correct the quantity of reducing agent supplied to the SCR catalyst taking account of the amount of PM deposited in the filter.

Non-patent Literature 1 discloses the fact that the quantity of ammonia adsorbed in an SCR catalyst supported on an SCR filter tends to increase as the amount of PM deposited in the SCR filter increases.

CITATION LIST

Patent Literature

PTL 1: Japanese Patent Application Laid-Open No. 2012-154229
PTL 2: Japanese Patent Application Laid-Open No. 2009-293606
PTL 3: Japanese Patent Application Laid-Open No. 2001-193440

Non-Patent Literature

"Physico-Chemical Modeling of an Integrated SCR on DPF (SCR/DPF) system", SAE International Journal of Engines, August 2012 vol. 5 no. 3, 958-974

SUMMARY

Technical Problem

Embodiments of the present disclosure may estimate the amount of ammonia adsorbed in an SCR catalyst in an SCR filter provided in an exhaust passage of an internal combustion engine as accurately as possible.

Solution to Problem

As an SCR filter traps PM in the exhaust gas, the trapped PM is deposited in the SCR filter gradually. In the SCR filter, PM is firstly deposited in partition walls of the SCR filter, specifically, in micro-pores in the partition walls. After the amount of PM deposited in the partition walls reaches its upper limit, PM is deposited on the surface of partition walls. In the following, deposition of PM in the partition walls of the SCR filter will be sometimes referred to as "in-wall PM deposition", and the period during which the in-wall PM deposition progresses will be sometimes referred to as the "in-wall PM deposition period". The amount of PM deposited in the partition walls of the SCR filter will be sometimes referred to as the "in-wall PM deposition amount". Furthermore, deposition of PM on the surface of partition walls of the SCR filter will be sometimes referred to as "surface PM deposition", and the period during which the surface PM deposition progresses will be sometimes referred to as the "surface PM deposition period". The amount of PM deposited on the surface of the partition walls of the SCR filter will be sometimes referred to as the "surface PM deposition amount".

As described above, it has been conventionally considered that increases in the amount of PM deposited in the SCR filter tends to make the amount of ammonia adsorbed in an SCR catalyst supported on the SCR filter more apt to increase. However, details of relationship between the state of deposition of PM in the SCR filter and the tendency of increase of the ammonia adsorption amount in the SCR catalyst had not been known previously. The inventors of the present disclosure discovered the tendency that while the ammonia adsorption amount in the SCR catalyst is more apt to increase when the in-wall PM deposition amount in the SCR filter is large than when the in-wall PM deposition amount is small, increases or decreases in the surface PM deposition amount in the SCR filter have little effect on increases or decreases in the ammonia adsorption amount in the SCR catalyst. It is considered that the reason why the ammonia adsorption amount in the SCR catalyst is more apt to increase when the in-wall PM deposition amount in the SCR filter is large than when the in-wall PM deposition amount is small is that increases in the in-wall PM deposition amount lead to increases in the saturated ammonia adsorption amount of the SCR catalyst, leading to decreases in the quantity of ammonia desorbed from the SCR catalyst. On the other hand, changes in the surface PM deposition amount lead to little changes in the saturated ammonia adsorption amount of the SCR catalyst, and little changes in the quantity of ammonia desorbed from the SCR catalyst accordingly. Therefore, it is considered that increases or decreases in the surface PM deposition amount in the SCR filter have little effect on increases or decreases in the ammonia adsorption amount in the SCR catalyst for this reason. The present disclosure bases the estimation of the ammonia adsorption amount in the SCR catalyst in the SCR filter on the above-described findings.

More specifically, according to the present disclosure, there may be provided an ammonia adsorption amount estimation apparatus for estimating the amount of ammonia adsorbed in an SCR catalyst in an SCR filter, which is provided in an exhaust passage of an internal combustion engine and includes a filter and said SCR catalyst supported thereon, said SCR catalyst having a capability of reducing NOx in exhaust gas by using as reducing agent ammonia supplied by an ammonia supply device provided in said exhaust passage upstream of said SCR filter, and said filter having a function of trapping particulate matter in exhaust gas, comprising: an adsorption amount calculation unit configured to calculate the amount of ammonia adsorbed in said SCR catalyst by integrating an ammonia supply quantity defined as the quantity of ammonia supplied to said SCR filter by said ammonia supply device, an ammonia consumption quantity defined as the quantity of ammonia consumed in reduction of NOx in said SCR catalyst, and an ammonia desorption quantity defined as the quantity of ammonia desorbed from said SCR catalyst, said adsorption amount calculation unit being configured to calculate the ammonia adsorption amount in said SCR catalyst of this time by adding said ammonia supply quantity to a previous adsorption amount value defined as a value of the ammonia adsorption amount in said SCR catalyst calculated last time and subtracting said ammonia consumption quantity and said ammonia desorption quantity from it; and a desorption quantity calculation unit configured to calculate said ammonia desorption quantity on the basis of the temperature of said SCR filter at the time when said ammonia desorption quantity is calculated and said previous adsorption amount value, wherein if the temperature of said SCR filter and said previous adsorption amount value are the same, the value of said ammonia desorption quantity calculated by said desorption quantity calculation unit is smaller when a differential pressure change rate at the time when said ammonia desorption quantity is calculated is lower than a predetermined threshold than when said differential pressure change rate is equal to or higher than said predetermined threshold, said differential pressure change rate being defined obtained by normalizing the differential pressure of the exhaust gas across said SCR filter by the exhaust gas rate per unit increase in a filter PM deposition amount defined as the amount of particulate matter deposited in said SCR filter that is estimated on the basis of a parameter other than said converted differential pressure value.

The SCR filter in the apparatus according to the present disclosure may be supplied with ammonia as reducing agent by the ammonia supply device. The ammonia thus supplied is adsorbed by the SCR catalyst supported on the SCR filter. The ammonia supply device may supply ammonia in the form of either gas or liquid, or alternatively the ammonia supply device may supply precursor of ammonia.

The ammonia adsorption amount estimation apparatus according to the present disclosure may be configured to calculate the ammonia adsorption amount at the present time by integrating the change in the ammonia adsorption amount in the SCR catalyst. Specifically, the ammonia adsorption amount in the SCR catalyst of this time (namely, the ammonia adsorption amount at the present time) is calculated by the adsorption amount calculation unit by adding the ammonia supply quantity as an increase to the previous adsorption amount value and subtracting the ammonia consumption quantity and the ammonia desorption quantity as decreases from it. The value of the ammonia adsorption amount of this time thus calculated will serve as the previous adsorption amount value in the next time calculation.

In the apparatus according to the present disclosure, the ammonia desorption quantity may be calculated by the desorption quantity calculation unit on the basis of the temperature of the SCR filter (which will be sometimes referred to as the "filter temperature" hereinafter) and the previous adsorption amount value. In calculation of the ammonia desorption quantity by the desorption quantity calculation unit, the calculated value is differentiated in accordance with whether or not the differential pressure change rate is smaller than the predetermined threshold, even if the filter temperature and the previous adsorption amount value are the same. The differential pressure change rate is the amount of increase of the converted differential pressure value per unit increase of the filter PM deposition amount. The value of the PM deposition amount is estimated on the basis of a parameter other than the converted differential pressure value. The differential pressure change rate defined as above has a smaller value during the surface PM deposition period than during the in-wall PM deposition period. Therefore, the predetermined threshold referred to in the apparatus according to the present disclosure may be set to a value with which a distinction between whether it is during the in-wall PM deposition period or during the surface PM deposition period now can be made, namely an identification between the in-wall PM deposition period and the surface PM deposition period can be made.

As described above, the mode of PM deposition in the SCR filter shifts to surface PM deposition after in-wall PM deposition reaches its upper limit. However, oxidation of PM in the SCR filter can occur both in partition walls of the SCR filter and on the surface of partition walls. Therefore, even after the mode of PM deposition in the SCR filter has once shifted to surface PM deposition, the in-wall PM deposition amount may be decreased by oxidation in some cases. In such cases, PM is deposited in partition walls again, in other words the mode of deposition shifts from surface PM deposition to in-wall PM deposition. Hence, it is difficult to make an identification between the in-wall PM deposition period and the surface PM deposition period with high accuracy only on the basis of the time elapsed since the start of deposition of PM in the SCR filter or the filter PM deposition amount (i.e. the overall amount of PM deposited in the SCR filter). Therefore, in the apparatus according to the present disclosure, the differential pressure change rate may be used as a parameter to make an identification between the in-wall PM deposition period and the surface PM deposition period.

During the surface PM deposition period, the in-wall PM deposition amount is always at its upper limit. This means that during the surface PM deposition period, the in-wall PM deposition amount is larger than that during the in-wall PM deposition period. Therefore, according to the above-described discovery, when the filter temperature and the ammonia adsorption amount in the SCR catalyst, which are parameters relating to (or affecting) the ammonia desorption quantity, are the same, the ammonia desorption quantity is smaller during the surface PM deposition period than during the in-wall PM deposition period.

Therefore, in the apparatus according to the present disclosure, the desorption quantity calculation unit may be configured to calculate the ammonia desorption quantity in such a way that the calculated value of the ammonia desorption quantity is smaller when the differential pressure change rate is lower than the predetermined threshold than when the differential pressure change rate is equal to or higher than the predetermined threshold. Therefore, even if the filter temperature and the previous adsorption amount value are the same, the calculated value of the ammonia desorption quantity is smaller during the surface PM deposition period than during the in-wall PM deposition period. In consequence, the calculated value of the ammonia adsorption amount is larger during the surface PM deposition period than during the in-wall PM deposition period, if the ammonia supply quantity, the ammonia consumption quantity, and the previous adsorption amount value are the same.

According to the present disclosure, the ammonia desorption quantity may be calculated with improved accuracy because the above-described relationship between the state of deposition of PM in the SCR filter and the ammonia desorption quantity is taken into account. Therefore, the ammonia adsorption amount in the SCR catalyst in the SCR catalyst can be calculated as accurately as possible.

According to the above-described discovery, during the surface PM deposition period, if the filter temperature and the ammonia adsorption amount in the SCR catalyst remain the same, the ammonia desorption quantity does not change even if the amount of PM deposited in the SCR filter changes, namely even if the surface PM deposition amount changes. In the ammonia adsorption amount estimation apparatus according to the present disclosure, when the differential pressure change rate at the time when the ammonia desorption quantity is calculated is lower than the predetermined threshold, the desorption quantity calculation unit may calculate the ammonia desorption quantity as a constant value irrespective of the filter PM deposition amount if the filter temperature and the previous adsorption amount value are the same. With this feature, during the surface PM deposition period, the ammonia desorption quantity is calculated as a constant value irrespective of the filter PM deposition amount, if the filter temperature and the previous adsorption amount value remain the same. Therefore, the ammonia adsorption amount in the SCR catalyst during the surface PM deposition period can be estimated with improved accuracy.

The ammonia adsorption amount estimation apparatus according to the present disclosure can be applied to an exhaust gas purification system of an internal combustion engine. An exhaust gas purification system of an internal combustion engine as such may comprise an SCR filter, an ammonia supply apparatus, an ammonia adsorption amount estimation apparatus according to the present disclosure, and a controller comprising at least one processor configured to control the quantity of ammonia supplied to the SCR filter. The controller may control the ammonia supply quantity in such a way as to make the ammonia adsorption amount in the SCR catalyst estimated by the ammonia adsorption amount estimation apparatus equal to a predetermined target adsorption amount. The exhaust gas purification system configured as above can keep/adjust the ammonia adsorption amount in the SCR catalyst at/to the predetermined target adsorption amount with as high accuracy as possible.

The present disclosure can also be construed as a method of estimating the ammonia adsorption amount. More specifically, according to the present disclosure, there may be provided an ammonia adsorption amount estimation method for estimating the amount of ammonia adsorbed in an SCR catalyst in SCR filter, which is provided in an exhaust passage of an internal combustion engine and includes a filter and said SCR catalyst supported thereon, said SCR catalyst having a capability of reducing NOx in exhaust gas by using as reducing agent ammonia supplied by an ammonia supply device provided in said exhaust passage upstream of said SCR filter, and said filter having a function of trapping particulate matter in exhaust gas, including: an adsorption amount calculation step of calculating the amount of ammonia adsorbed in said SCR catalyst by integrating an ammonia supply quantity defined as the quantity of ammonia supplied to said SCR filter by said ammonia supply device, an ammonia consumption quantity defined as the quantity of ammonia consumed in reduction of NOx in said SCR catalyst, and an ammonia desorption quantity defined as the quantity of ammonia desorbed from said SCR catalyst, said adsorption amount calculation step of adding said ammonia supply quantity to a previous adsorption amount value defined as a value of the ammonia adsorption amount in said SCR catalyst calculated last time and subtracting said ammonia consumption quantity and said ammonia desorption quantity from it to calculate the ammonia adsorption amount in said SCR catalyst of this time; and a desorption quantity calculation step of calculating said ammonia desorption quantity on the basis of the temperature of said SCR filter at the time when said ammonia desorption quantity is calculated and said previous adsorption amount value, wherein in said desorption quantity calculation step, the calculated value of said ammonia desorption quantity is smaller when a differential pressure change rate at the time when said ammonia description quantity is calculated is lower than a predetermined threshold than when said differential pressure change rate is equal to or higher than said predetermined threshold if the temperature of said SCR filter and said previous adsorption amount value are the same, said differential pressure change rate being defined as the amount of increase in a converted differential pressure value obtained by normalizing the differential pressure of the exhaust gas across said SCR filter by the exhaust gas rate per unit increase in a filter PM deposition amount defined as the amount of particulate matter deposited in said SCR filter that is estimated on the basis of a parameter other than said converted differential pressure value.

With the present disclosure, the amount of ammonia adsorbed in an SCR catalyst in an SCR filter provided in an exhaust passage of an internal combustion engine can be estimated as accurately as possible.

DESCRIPTION OF EMBODIMENTS

In the following, a specific embodiment of the present disclosure will be described with reference to the drawings. The dimensions, materials, shapes, relative arrangements, and other features of the components that will be described in connection with the embodiment are not intended to limit the technical scope of the present disclosure only to them, unless particularly stated.

Embodiment 1

Figure 1:
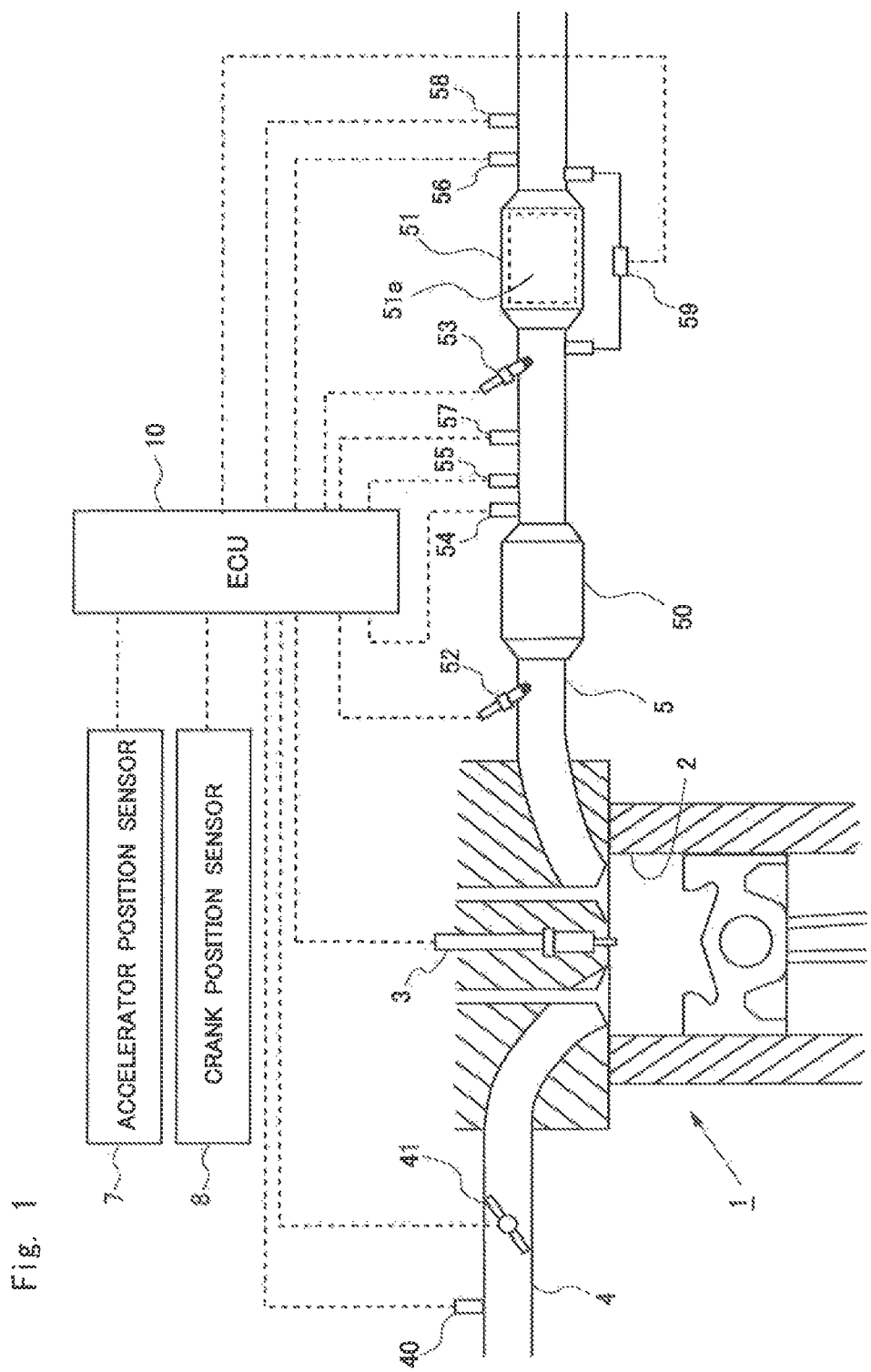
FIG. 1 is a diagram showing the general configuration of an internal combustion engine and its air-intake and exhaust systems according to embodiments of the present disclosure.

FIG. 1 is a diagram showing the general configuration of an internal combustion engine and its air-intake and exhaust systems according to an embodiment. The internal combustion engine 1 shown in FIG. 1 is a compression-ignition internal combustion engine (diesel engine) using light oil as fuel. It should be understood that the present disclosure can also be applied to a spark-ignition internal combustion engine using gasoline or the like as fuel.

The internal combustion engine 1 has a fuel injection valve 3 that injects fuel into a cylinder 2. In the case where the internal combustion engine 1 is a spark-ignition internal combustion engine, the fuel injection valve 3 may be adapted to inject fuel into an intake port.

The internal combustion engine 1 is connected with an intake passage 4. The intake passage 4 is provided with an air flow meter 40 and a throttle valve 41. The air flow meter 40 outputs an electrical signal representing the quantity (or mass) of the intake air flowing in the intake passage 4. The throttle valve 41 is arranged in the intake passage 4 downstream of the air-flow meter 40. The throttle valve 41 changes the channel cross sectional area of the intake passage 4 to adjust the intake air quantity of the internal combustion engine 1.

The internal combustion engine 1 is connected with an exhaust passage 5. The exhaust passage 5 is provided with an oxidation catalyst 50, an SCR filter 51, a fuel addition valve 52, and a urea solution addition valve 53. The SCR filter 51 is composed of a wall-flow filter made of a porous base material and an SCR catalyst 51a supported thereon. The filter has the function of trapping PM in the exhaust gas. The SCR catalyst 51a is capable of reducing NOx in the exhaust gas using ammonia as reducing agent. Thus, the SCR filter 51 is capable of trapping PM and removing NOx. The oxidation catalyst 50 is provided in the exhaust passage 5 upstream of the SCR filter 51. The fuel addition valve 52 is provided in the exhaust passage upstream of the oxidation catalyst 50. The fuel addition valve 52 is used to add fuel to the exhaust gas flowing in the exhaust passage 5. The urea solution addition valve 53 is provided in the exhaust passage 5 downstream of the oxidation catalyst 50 and upstream of the SCR filter 51. The urea solution addition valve 53 is used to add urea solution to the exhaust gas flowing in the exhaust passage 5. As urea solution is added to the exhaust gas through the urea solution addition valve 53, the urea solution is supplied to the SCR filter 51. In other words, urea as a precursor of ammonia is supplied to the SCR filter 51. In the SCR filter 51, ammonia generated by hydrolysis of supplied urea is adsorbed in the SCR catalyst 51a. The ammonia adsorbed in the SCR catalyst 51a functions as a reducing agent to reduce NOx in the exhaust gas. The urea solution addition valve 53 may be replaced by an ammonia addition valve that adds ammonia gas to the exhaust gas.

The exhaust passage 5 downstream of the oxidation catalyst 50 and upstream of the urea solution addition valve 53 is provided with an $O_2$ sensor 54, an upstream temperature sensor 55, and an upstream NOx sensor 57. The exhaust passage 5 downstream of the SCR filter 51 is provided with a downstream temperature sensor 56 and a downstream NOx sensor 58. The $O_2$ sensor 54 outputs an electrical signal representing the $O_2$ concentration in the exhaust gas. The upstream temperature sensor 55 and the downstream temperature sensor 56 each output an electrical signal representing the temperature of the exhaust gas. The upstream NOx sensor 57 and the downstream NOx sensor 58 each output an electrical signal representing the NOx concentration in the exhaust gas. The exhaust passage 5 is provided with a differential pressure sensor 59. The differential pressure sensor 59 outputs an electrical signal representing the differential pressure of the exhaust gas across the SCR filter 51, which will be sometimes referred to as the filter differential pressure hereinafter.

The internal combustion engine 1 is equipped with an electronic control unit (ECU) 10. The ECU 10 is a unit that controls the operation state of the internal combustion engine 1. The ECU 10 is electrically connected with various sensors including an accelerator position sensor 7 and a crank position sensor 8 as well as the air flow meter 40, the $O_2$ sensor 54, the upstream temperature sensor 55, the upstream NOx sensor 57, the downstream temperature sensor 56, the downstream NOx sensor 58, and the differential pressure sensor 59 mentioned above. The accelerator position sensor 7 is a sensor that outputs an electrical signal representing the amount of operation of an accelerator pedal (accelerator opening degree), which is not shown in the drawings. The crank position sensor 8 is a sensor that outputs an electrical signal representing the rotational position of the engine output shaft (or crankshaft) of the internal combustion engine 1. Signals output from these sensors are input to the ECU 10. The ECU 10 estimates the temperature of the SCR filter 51 on the basis of the output value of the downstream temperature sensor 56. This temperature will be sometimes referred to as the "filter temperature" hereinafter. The ECU 10 estimates the flow rate of the exhaust gas flowing into the SCR filter 51 on the basis of the output value of the air flow meter 40. This flow rate will be sometimes simply referred to as the "exhaust gas flow rate" hereinafter.

The ECU 10 is electrically connected with various devices including the fuel injection valve 3, the throttle valve 41, the fuel addition valve 52, and the urea solution addition valve 53 mentioned above. The ECU 10 controls these devices using signals output from the aforementioned sensors. For instance, the ECU 10 controls the quantity of urea solution added through the urea solution addition valve 53 so as to keep/adjust the ammonia adsorption amount in the SCR catalyst 51a at/to a predetermined target adsorption amount. The predetermined target adsorption amount is determined in advance by, for example, an experiment as a value at which a desired NOx removal rate with the SCR filter can be achieved and the quantity of ammonia flowing out of the SCR filter 51 can be kept within an allowable range.

The ECU 10 executes a filter regeneration process by adding fuel through the fuel addition valve 52 at the time when the amount of PM deposited in the SCR filter 51 (which will be sometimes referred to as the "filter PM deposition amount" hereinafter) reaches a predetermined deposition amount. The filter PM deposition amount is estimated by a method that will be described later. In the filter regeneration process, the temperature of the SCR filter 51 is raised by oxidation heat produced by oxidation of fuel added through the fuel addition valve 52 in the oxidation catalyst 50. As a result, the PM deposited in the SCR filter 51 is burned and removed.

(Estimation of the Filter PM Deposition Amount)

Figure 2:
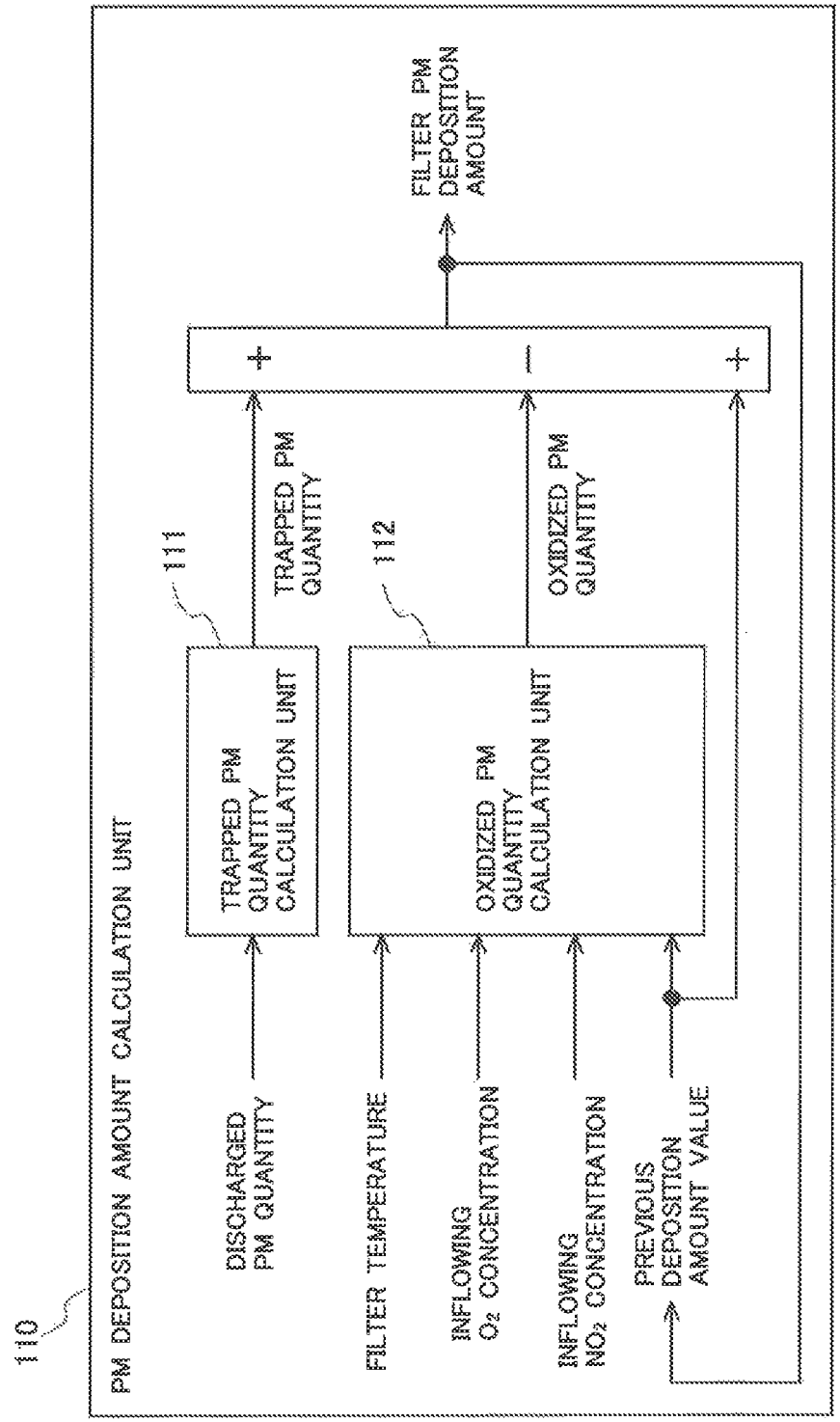
FIG. 2 is a block diagram illustrating the functions of a PM deposition amount calculation unit in an ECU according to embodiments of the present disclosure.

In this embodiment, the ECU 10 calculates the filter PM deposition amount repeatedly at regular calculation intervals. FIG. 2 is a block diagram illustrating the functions of a PM deposition amount calculation unit in the ECU 10. The PM deposition amount calculation unit 110 is a functional unit configured to calculate the filter PM deposition amount. The PM deposition amount calculation unit 110 is constituted by execution of a certain program in the ECU 10. The PM deposition amount calculation unit 110 in this embodiment is configured to calculate the filter PM deposition amount without using a converted differential pressure value, which is obtained by normalizing the filter differential pressure measured by the differential pressure sensor 59 by the exhaust gas flow rate. The converted differential pressure value will be described later. Furthermore, the PM deposition amount calculation unit 110 in this embodiment is configured to calculate the filter PM deposition amount on the assumption that the PM trapping function of the SCR filter 51 is in a normal condition.

The PM deposition amount calculation unit 110 calculates the filter PM deposition amount at the present time by integrating the trapped PM quantity defined as the quantity of PM trapped by the SCR filter 51 and the oxidized PM quantity defined as the quantity of PM oxidized in the SCR filter 51. Specifically, the PM deposition amount calculation unit 110 includes a trapped PM quantity calculation unit 111 and an oxidized PM quantity calculation unit 112. The trapped PM quantity calculation unit 111 calculates a trapped PM quantity as the quantity of PM trapped by the SCR filter 51 over a first predetermined period that is determined in accordance with the interval of calculation of the filter PM deposition amount. The oxidized PM quantity calculation unit 112 calculates an oxidized PM quantity as the quantity of PM oxidized in the SCR filter 51 over the first predetermined period.

The trapped PM quantity calculation unit 111 has as an input the quantity of PM discharged from the internal combustion engine 1 over the first predetermined period (which will be sometimes simply referred to as the "discharged PM quantity" hereinafter). The discharged PM quantity can be estimated on the basis of the operation state of the internal combustion engine 1. The trapped PM quantity calculation unit 111 calculates the trapped PM quantity by multiplying the input value of the discharged PM quantity by a predetermined PM trapping rate, which is the rate of the quantity of PM trapped by the SCR filter 51 to the quantity of PM flowing into the SCR filter 51. The predetermined PM trapping rate may be determined on the basis of the exhaust gas flow rate.

The oxidized PM quantity calculation unit 112 has as inputs the filter temperature, the $O_2$ concentration in the exhaust gas flowing into the SCR filter 51 (which will be sometimes referred to as the "inflowing $O_2$ concentration" hereinafter), and the $NO_2$ concentration in the exhaust gas flowing into the SCR filter 51 (which will be sometimes referred to as the "inflowinq $NO_2$ concentration" hereinafter). The filter temperature can be estimated from the output value of the downstream temperature senor 56. The inflowing $O_2$ concentration is measured by the $O_2$ sensor 54. Alternatively, the inflowing $O_2$ concentration can be estimated on the basis of the air-fuel ratio of the exhaust gas and the operation state of the internal combustion engine 1 etc. The inflowing $NO_2$ concentration can be estimated from the output value of the air flow meter 40, the output value of the upstream temperature sensor 55, and the output value of the upstream NOx sensor 57 etc. More specifically, the quantity of NOx in the exhaust gas can be estimated from the output value of the upstream NOx sensor 57 and the exhaust gas flow rate. The proportion of the quantity of $NO_2$ in the quantity of NOx in the exhaust gas can be estimated from the temperature of the oxidation catalyst 50, which is estimated from the output value of the upstream temperature sensor 55, and the exhaust gas flow rate. Then, the inflowing $NO_2$ concentration can he estimated from the quantity of NOx in the exhaust gas and the estimated proportion of the quantity of $NO_2$ in the quantity of NOx in the exhaust gas etc. Furthermore, the oxidized PM quantity calculation unit 112 also has as an input a value of the filter PM deposition amount calculated in the previous (or last time) calculation. This input value will be sometimes referred to as the "previous deposition amount value" hereinafter. The oxidized PM quantity calculation unit 112 calculates the oxidized PM quantity from the input values of the filter temperature, the inflowing $O_2$ concentration, the inflowing $NO_2$ concentration, and the previous deposition amount value.

The PM deposition amount calculation unit 110 calculates the filter PM deposition amount of this time (or the filter PM deposition amount at the present time) by adding the trapped PM quantity as an increase to the previous deposition amount value and subtracting the oxidized PM quantity as a decrease from it. The filter PM deposition amount of this time thus calculated will serve as the previous deposition amount value in the next time calculation process.

The method of calculation of the filter PM deposition amount according to embodiments of the present disclosure is not limited to that described above. In embodiments of the present disclosure, the filter PM deposition amount may be calculated by any known method without using the converted differential pressure value that will be described later.

(Estimation of Ammonia Adsorption Amount)

Figure 3:
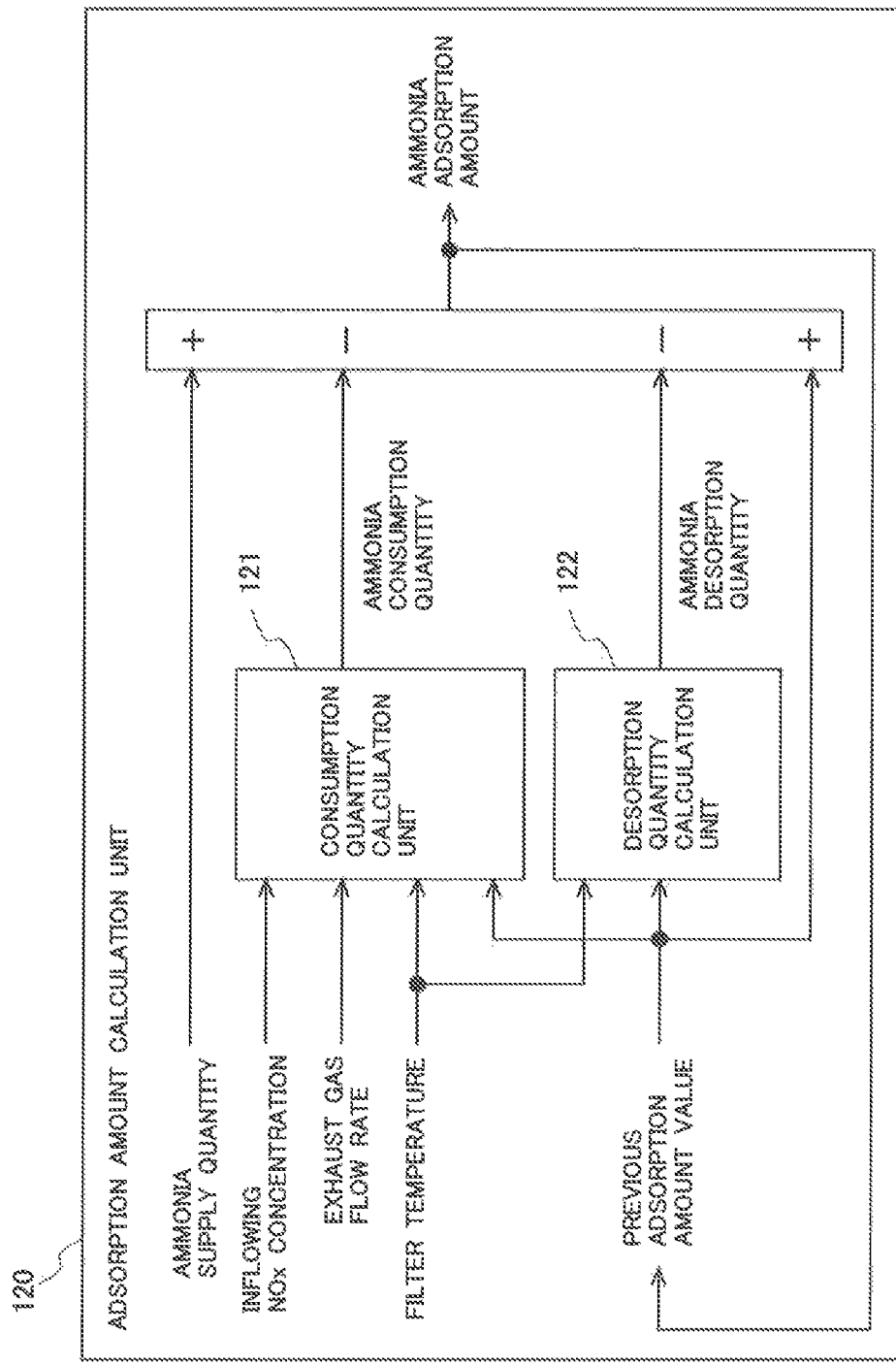
FIG. 3 is a block diagram illustrating the functions of an adsorption amount calculation unit in the ECU according to embodiments of the present disclosure.

In this embodiment, the ECU 10 calculates the ammonia adsorption amount defined as the amount of ammonia adsorbed in the SCR catalyst 51a repeatedly at a predetermined calculation interval. FIG. 3 is a block diagram illustrating the functions of an adsorption amount calculation unit in the ECU 10. The adsorption amount calculation unit 120 is a functional unit configured to calculate the amount of ammonia adsorbed in the SCR catalyst 51a. The adsorption amount calculation unit 120 is constituted by execution of a certain program in the ECU 10. The adsorption amount calculation unit 120 in this embodiment is configured to calculate the ammonia adsorption amount on the assumption that the NOx removal capability of the SCR filter 51 is in a normal condition.

The adsorption amount calculation unit 120 calculates the ammonia adsorption amount at the present time by integrating the ammonia supply quantity defined as the quantity of ammonia supplied to the SCR filter 51, the ammonia consumption quantity defined as the quantity of ammonia consumed in reduction of NOx in the SCR catalyst 51a, and the ammonia desorption quantity defined as the quantity of ammonia desorbed from the SCR catalyst 51a. Specifically, the adsorption amount calculation unit 120 includes a consumption quantity calculation unit 121 and a desorption quantity calculation unit 122. The consumption quantity calculation unit 121 calculates the ammonia consumption quantity as the quantity of ammonia consumed in reduction of NOx in the SCR catalyst 51a over a second predetermined period that is determined in accordance with the interval of calculation of the ammonia adsorption amount. The desorption quantity calculation unit 122 calculates the ammonia desorption quantity as the quantity of ammonia desorbed from the SCR catalyst 51a over the second predetermined period. Furthermore, the adsorption amount calculation unit 120 is configured to estimate the ammonia supply quantity as the quantity of ammonia supplied to the SCR filter 51 over the second predetermined period. As described above, the ammonia supplied to the SCR filter is produced by hydrolysis of urea contained in urea solution added through the urea solution addition valve 53. Therefore, the ammonia supply quantity can be estimated from the quantity of urea solution added through the urea solution addition valve 53 over the second predetermined period.

The consumption quantity calculation unit 121 has as inputs the NOx concentration in the exhaust gas flowing into the SCR filter 51 (which will be sometimes referred to as the "inflowing NOx concentration" hereinafter), the exhaust gas flow rate, the filter temperature, and the value of the ammonia adsorption amount in the SCR catalyst 51a calculated in the previous (or last time) calculation (which will be sometimes referred to as the "previous adsorption amount value" hereinafter): The inflowing NOx concentration is measured by the upstream NOx sensor 57. The NOx removal rate with the SCR catalyst 51a depends on the exhaust gas flow rate, the filter temperature, and the ammonia adsorption amount in the SCR catalyst 51a. Therefore, the consumption quantity calculation unit 121 is configured to calculate the NOx removal rate expected to be achieved by the SCR catalyst 51a at the present time (which will be hereinafter referred to as the "estimated NOx removal rate") from the input values of the exhaust gas flow rate, the filter temperature, and the previous adsorption amount value. Furthermore, the consumption quantity calculation unit 121 is also configured to calculate the quantity of NOx flowing into the SCR filter over the second predetermined period (which will be sometimes referred to as the "inflowing NOx quantity" hereinafter) from the input values of the inflowing NOx concentration and the exhaust gas flow rate. The ammonia consumption quantity is calculated from the estimated NOx removal rate and the inflowing NOx quantity calculated as above.

Figure 4:
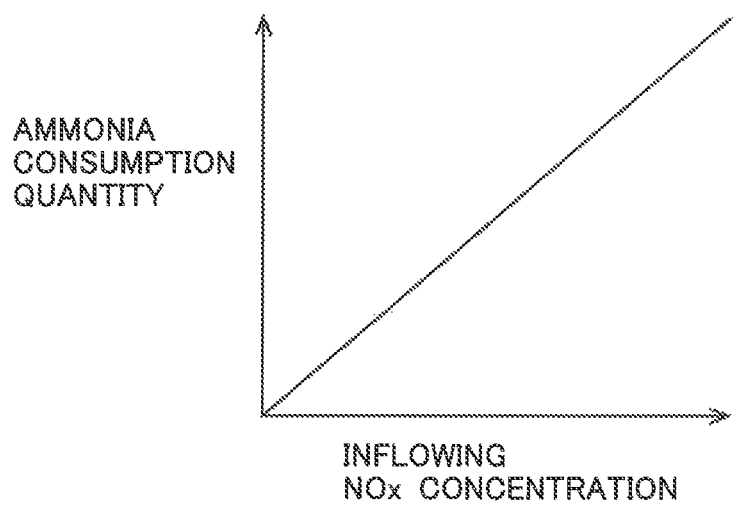
FIG. 4 is a graph showing relationship between the inflowing NOx concentration and the ammonia consumption quantity.
Figure 5:
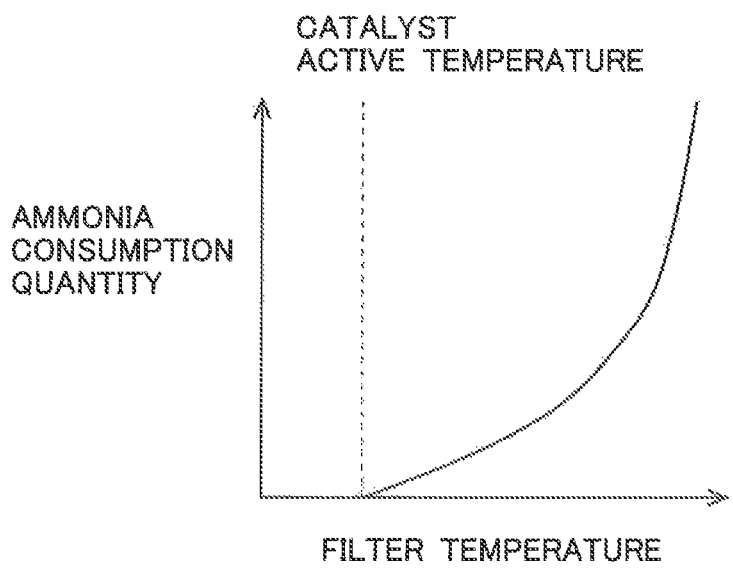
FIG. 5 is a graph showing relationship between the filter temperature and the ammonia consumption quantity.
Figure 6:
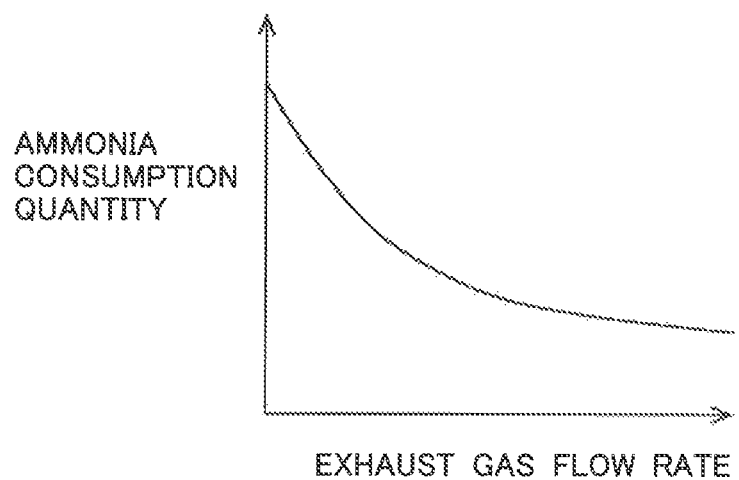
FIG. 6 is a graph showing relationship between the exhaust gas flow rate and the ammonia consumption quantity.
Figure 7:
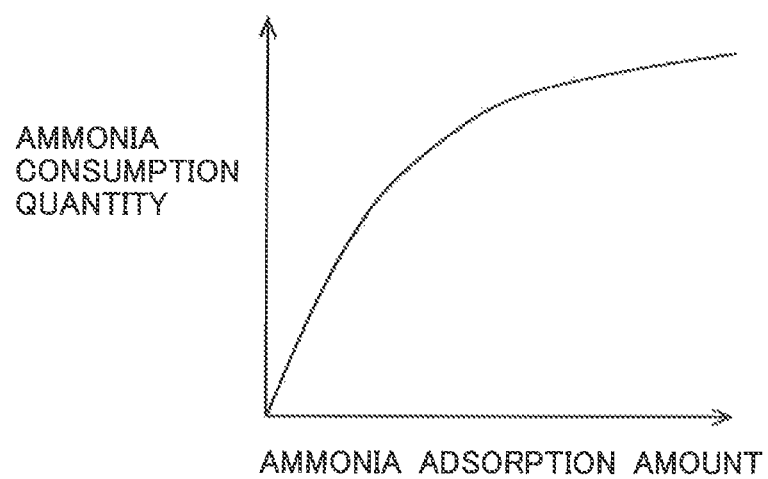
FIG. 7 is a graph showing relationship between the ammonia adsorption amount in an SCR catalyst and, the ammonia consumption quantity.

FIG. 4 is a graph showing relationship between the inflowing NOx concentration and the ammonia consumption quantity. As shown in FIG. 4, if the other parameters relating to the ammonia consumption quantity remain the same, the higher the inflowing NOx concentration is, the larger the ammonia consumption quantity is. FIG. 5 is a graph showing relationship between the filter temperature and the ammonia consumption quantity. As shown in FIG. 5, if the other parameters relating to the ammonia consumption quantity remain the same, the higher the filter temperature is above the active temperature of the SCR catalyst 51a, the larger the ammonia consumption quantity is. FIG. 6 is a graph showing relationship between the exhaust gas flow rate and the ammonia consumption quantity. As shown in FIG. 6, if the other parameters relating to the ammonia consumption quantity remain the same, the higher the exhaust gas flow rate is, the smaller the ammonia consumption quantity is. FIG. 7 is a graph showing relationship between the ammonia adsorption amount in the SCR catalyst 51a and the ammonia consumption quantity. As shown in FIG. 7, if the other parameters relating to the ammonia consumption quantity remain the same, the larger the ammonia adsorption amount in the SCR catalyst 51a is, the larger the ammonia consumption quantity is. The consumption quantity calculation unit 121 is configured to calculate the ammonia consumption quantity on the basis of the relationship of the ammonia consumption quantity with the inflowing NOx concentration, the filter temperature, the exhaust gas flow rate, and the ammonia adsorption amount in the SCR catalyst 51a shown in these graphs.

Figure 8:
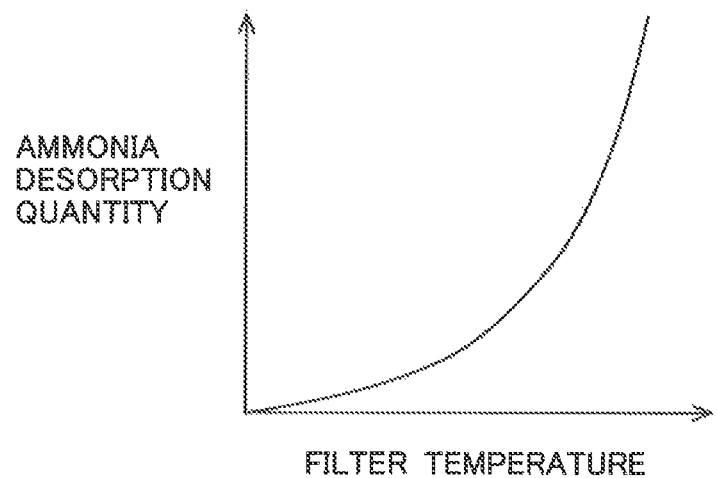
FIG. 8 is a graph showing relationship between the filter temperature and the ammonia desorption quantity.
Figure 9:
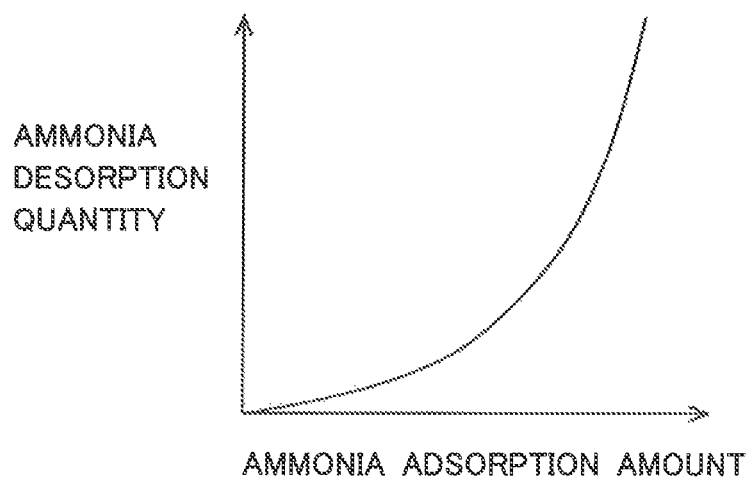
FIG. 9 is a graph showing relationship between the ammonia adsorption amount in the SCR catalyst and the ammonia desorption quantity.

The desorption quantity calculation unit 122 has as inputs the filter temperature and the previous adsorption amount value. The desorption quantity calculation unit 122 calculates the ammonia desorption quantity from the input values of the filter temperature and the previous adsorption amount value. FIG. 8 is a graph showing relationship between the filter temperature and the ammonia desorption quantity. As shown in FIG. 8, if the ammonia adsorption amount in the SCR catalyst 51a is the same, the higher the filter temperature is, the larger the ammonia desorption quantity is. FIG. 9 is a graph showing relationship between the ammonia adsorption amount in the SCR catalyst 51a and the ammonia desorption quantity. As shown in FIG. 9, if the filter temperature is the same, the larger the ammonia adsorption amount in the SCR catalyst 51a is, the larger the ammonia desorption quantity is. The desorption quantity calculation unit 122 is configured to calculate the ammonia desorption quantity on the basis of the relationship of the ammonia desorption quantity with the filter temperature and the ammonia adsorption amount in the SCR catalyst 51a shown in these graphs. Details of the process of calculating the ammonia desorption quantity by the desorption quantity calculation unit 122 in this embodiment will be described later.

The adsorption amount calculation unit 120 is configured to calculate the value of the ammonia adsorption amount in the SCR catalyst 51a of this time by adding the ammonia supply quantity as an increase to the previous adsorption amount value and subtracting the ammonia consumption quantity and the ammonia desorption quantity as decreases from it.

(Calculation of Ammonia Desorption Quantity)

In the following, the process of calculation of the ammonia desorption quantity by the desorption quantity calculation unit 122 in this embodiment will be described specifically. If the SCR catalyst 51a is in an equilibrium state in which the rate of adsorption of ammonia and the rate of desorption of ammonia are equal, the relationship between the ammonia adsorption amount in the SCR catalyst 51a and the ammonia desorption quantity can be expressed by the following equation 1 according to the Langmuir adsorption isotherm equation:

$$AD = \frac{K \times dD}{1 + K \times dD} \times \sigma_0, \qquad \text{equation 1}$$

where AD is the ammonia adsorption amount in the SCR catalyst 51a, dD is the ammonia desorption quantity, $\sigma_0$ is the saturated ammonia adsorption amount of the SCR catalyst 51a, and K is an equilibrium constant.

The above equation 1 can be transformed into the following equation 2, which can be used as an equation for calculating the ammonia desorption quantity:

$$dD = \frac{AD}{K \times \sigma_0 \times \left(1 - \frac{1}{\sigma_0} \times AD\right)}. \qquad \text{equation 2}$$

Figure 10:
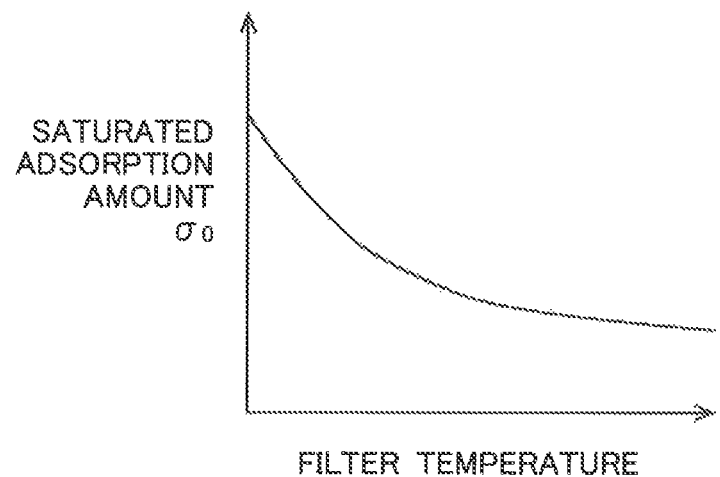
FIG. 10 is a graph showing relationship between the filter temperature and the saturated adsorption amount of the SCR catalyst supported on an SCR filter.
Figure 11:
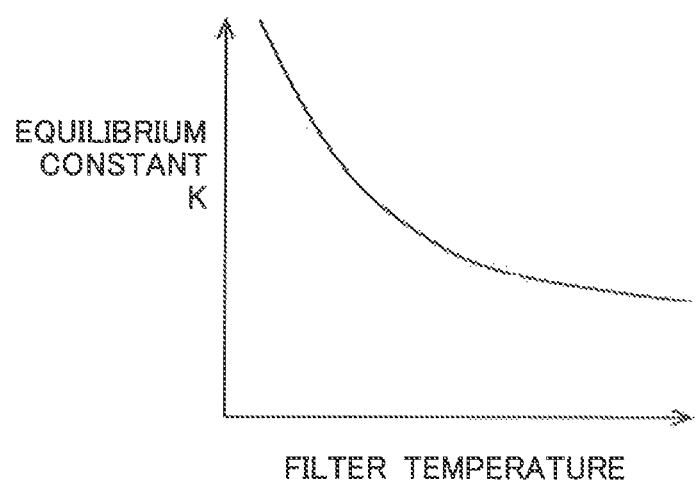
FIG. 11 is a graph showing relationship between the filter temperature and an equilibrium constant.

The saturated ammonia adsorption amount $\sigma_0$ of the SCR catalyst 51a is the largest amount of ammonia that can be adsorbed in the SCR catalyst 51a and will be sometimes simply referred to as the "saturated adsorption amount" hereinafter. The saturated ammonia adsorption amount on in the SCR catalyst 51a and the equilibrium constant K vary depending on the filter temperature. FIG. 10 is a graph showing relationship between the filter temperature and the saturated adsorption amount $\sigma_0$ of the SCR catalyst 51a. As shown in FIG. 10, the higher the filter temperature is, the smaller the saturated adsorption amount $\sigma_0$ of the SCR catalyst 51a is. FIG. 11 is a graph showing relationship between the equilibrium constant K and the filter temperature. As shown in FIG. 11, the higher the filter temperature is, the smaller the equilibrium constant K is. The ammonia desorption quantity dD and the ammonia adsorption amount AD in the SCR catalyst 51a are in the relationship expressed by the above equation 2, and the saturated adsorption amount $\sigma_0$ of the SCR catalyst 51a and the equilibrium constant K are in the relationships shown in FIGS. 10 and 11 respectively with the filter temperature. From this follow the relationship shown in FIG. 8 between the filter temperature and the ammonia desorption quantity and the relationship shown in FIG. 9 between the ammonia adsorption amount in the SCR catalyst 51a and the ammonia desorption quantity.

As described before, the inventors of the present disclosure made findings about relationship between the state of deposition of PM in the SCR filter and the tendency of increase of the ammonia adsorption amount in the SCR catalyst. According to the findings, when the filter temperature and the ammonia adsorption amount in the SCR catalyst 51a are the same, the ammonia desorption quantity is smaller when the amount of PM deposited in the partition walls of the SCR filter 51 (or the in-wall PM deposition amount) is large than when the in-wall PM deposition amount is small. Therefore, when the other parameters relating to the increase of the ammonia adsorption amount in the SCR catalyst 51a remain the same, the ammonia adsorption amount in the SCR catalyst 51a is more apt to increase when the in-wall PM deposition amount is large than when the in-wall PM deposition amount is small. At times after the in-wall PM deposition amount in the SCR filter 51 has reached its upper limit and the mode of deposition of PM in the SCR filter 51 has shifted from in-wall PM deposit ore to surface PM deposition, the ammonia desorption quantity changes little even when the filter PM deposition amount (that is, the surface PM deposition amount) changes, so long as the filter temperature and the ammonia adsorption amount in the SCR catalyst 51a remain the same. Therefore, increases or decreases in the surface PM deposition amount have little effect on increases or decreases in the ammonia adsorption amount in the SCR catalyst 51a.

Figure 12:
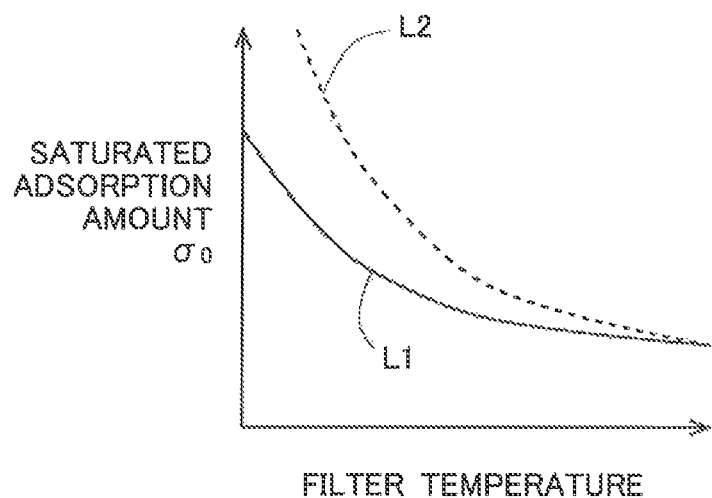
FIG. 12 is a graph illustrating how the state of deposition of PM in the SCR filter affects the saturated ammonia adsorption amount of the SCR catalyst supported on the SCR filter.

The above-described tendency of change in the ammonia adsorption amount in the SCR catalyst 51a depending on the state of deposition of PM in the SCR filter 51 is considered to be attributable to relation between the state of deposition of PM in the SCR filter 51 and the saturated adsorption amount in the SCR catalyst 51a. FIG. 12 is a graph illustrating how the state of deposition of PM in the SCR filter 51 affects the saturated adsorption amount of the SCR catalyst 51a. In FIG. 12, the horizontal axis represents the filter temperature, and the vertical axis represents the saturated adsorption amount of the SCR catalyst 51a. Line L1 in FIG. 12 represents relationship between the filter temperature and the saturated adsorption amount in a state in which PM is not deposited in the SCR filter 51. Line L2 in FIG. 12 represents relationship between the filter temperature and the saturated adsorption amount in a state in which PM is deposited in the SCR filter 51. As described above, the higher the filter temperature is, the smaller the saturated adsorption amount of the SCR catalyst 51a is. In other words, the lower the filter temperature is, the larger the saturated adsorption amount of the SCR catalyst 51a is. Therefore, as shown in FIG. 12, at the same filter temperature the saturated adsorption amount of the SCR catalyst 51a is larger in the state in which PM is deposited in the SCR filter 51 than in the state in which PM is not deposited in the SCR filter 51.

Figure 13:
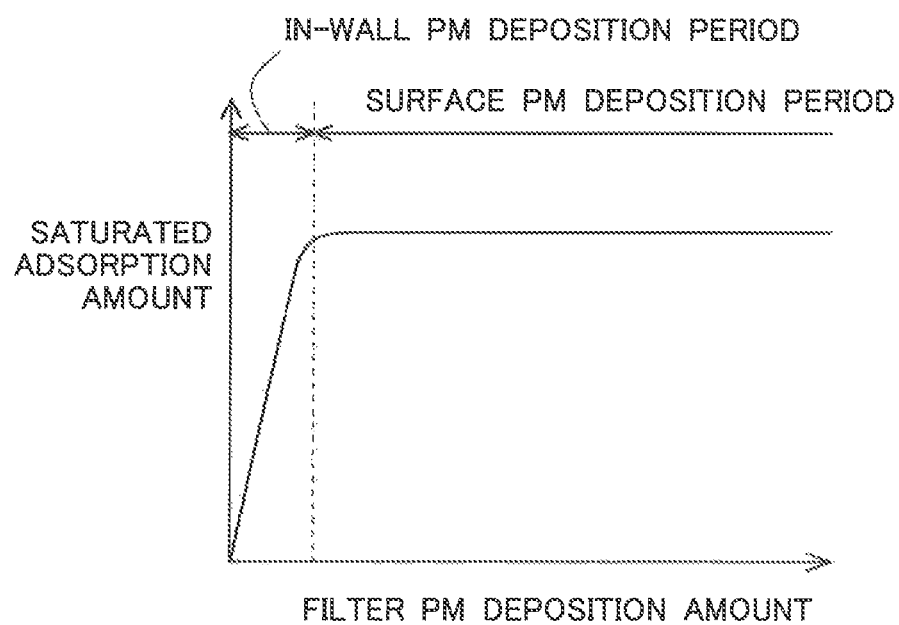
FIG. 13 is a graph showing relationship between the state of deposition of PM in the SCR filter and the saturated ammonia adsorption amount of the SCR catalyst.

Relationship between, the state of deposition of PM in the SCR filter 51 and the saturated adsorption amount of the SCR catalyst 51a will be described below more specifically with reference to FIG. 13. FIG. 13 is a graph showing relationship between the state of deposition of PM in the SCR filter 51 and the saturated adsorption amount of the SCR catalyst 51a. In FIG. 13, the horizontal axis represents the filter PM deposition amount, and the vertical axis represents the saturated adsorption amount of the SCR catalyst 51a. FIG. 13 shows the change of the saturated adsorption amount of the SCR catalyst 51a in a case where the filter temperature is kept constant.

As shown in FIG. 13, in the process of deposition of PM in the SCR filter 51, PM firstly deposits in partition walls (specifically micro-pores in partition wall). Then, after the in-wall PM deposition amount reaches its upper limit, PM deposits on the surface of partition walls. In other words, after the upper limit of the in-wall PM deposition amount is reached, the mode of deposition of PM in the SCR filter 51 shifts from in-wall PM deposition to surface PM deposition. In this process, as shown in FIG. 13, during the in-wall PM deposition period, the saturated adsorption amount of the SCR catalyst 51a increases in accordance with the increase in the filter PM deposition amount, namely in accordance with the increase in the in-wall PM deposition amount. On the other hand, during the surface PM deposition period, the saturated adsorption amount of the SCR catalyst 51a does not increase, even while the filter PM deposition amount increases, namely even while the surface PM deposition amount increases. It should be notated that the in-wall PM deposition amount is at its upper limit, during the surface PM deposition period. Therefore, during the surface PM deposition period, the saturated adsorption amount of the SCR catalyst 51a is constantly at the amount that is achieved when the in-wall PM deposition amount is at its upper limit. From the above, it is considered that the difference between the saturated adsorption amount of the SCR catalyst 51a in, the state in which PM is deposited in the SCR filter 51 and that in the state in which PM is not deposited in the SCR filter 51 shown in FIG. 12 is attributable to in-wall PM deposition.

During the surface PM deposition period, the in-wall PM deposition amount is larger than that during the in-wall PM deposition period, and the saturated adsorption amount of the SCR catalyst 51a is larger than that during the in-wall PM deposition period, as shown in FIG. 13, if the filter temperature is the same. The larger saturated adsorption amount of the SCR catalyst 51a makes ammonia less apt to be desorbed from the SCR catalyst 51a. Therefore, if the filter temperature and the ammonia adsorption amount in the SCR catalyst 51a remain the same, increases in the saturated adsorption amount of the SCR catalyst 51a lead to decreases in the ammonia desorption quantity. Therefore, the filter temperature and the ammonia adsorption amount in the SCR catalyst 51a, which correlate with the ammonia desorption quantity, remain the same, the ammonia desorption quantity during the surface PM deposition period is smaller than that during the in-wall PM deposition period. Therefore, it is considered that the ammonia adsorption amount in the SCR catalyst 51a is more apt to increase during the surface PM deposition period than during the in-wall PM deposition period. In other words, it is considered that the increase in the ammonia adsorption amount in the SCR catalyst 51a is larger during the surface PM deposition period than during theme-wall PM deposition period, if the other parameters relating to the increase of the ammonia adsorption amount in the SCR catalyst 51a remain the same.

During the surface PM deposition period, the saturated adsorption amount of the SCR catalyst 51a does not increase even if the filter PM deposition amount increases, namely even if the surface PM deposition amount increases. Therefore, during the surface PM deposition period, the ammonia desorption quantity does not change even if the surface PM deposition amount changes, if the filter temperature and the ammonia adsorption amount in the SCR catalyst 51a remain the same. For this reason, it is considered that during the surface PM deposition period, increases or decreases in the filter PM deposition amount (i.e. increases or decreases in the surface PM deposition amount) have little effect on increases or decreases in the ammonia adsorption amount in the SCR catalyst 51a. In other words, if the other parameters relating to the increase of the ammonia adsorption amount in the SCR catalyst 51a remain the same, it is considered that the increase in the ammonia adsorption amount in the SCR catalyst 51a remains constant during the surface PM deposition period, irrespective of the filter PM deposition amount, namely irrespective of the surface PM deposition amount.

Figure 14:
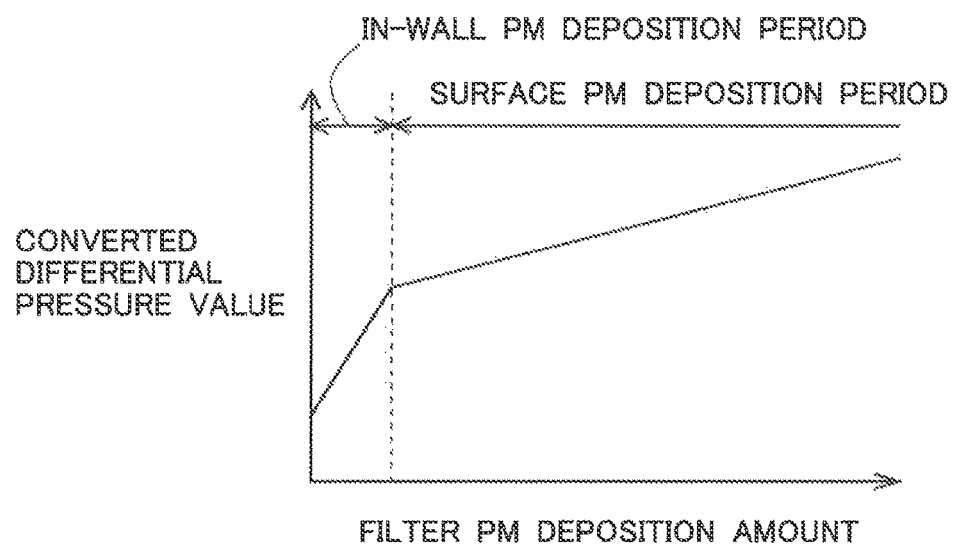
FIG. 14 is a graph showing changes in the converted differential pressure value with increases in the filter PM deposition amount.

Next, a method of making an identification between the in-wall PM deposition period and the surface PM deposition period according to the embodiment will be described with reference to FIG. 14. FIG. 14 is a graph showing changes in the converted differential pressure value with increases in the filter PM deposition amount. In FIG. 14, the horizontal axis represents the filter PM deposition amount and the vertical axis represents the converted differential pressure value.

The converted differential pressure value is a converted value of the filter differential pressure obtained by normalizing the filter differential pressure measured by the differential pressure sensor 59 by the exhaust gas flow rate. More specifically, the converted differential pressure value in this embodiment is expressed by the following equation 3:

$$Ap=dP/Qg \qquad \text{equation 3,}$$

where Ap is the converted differential pressure value, dP is the filter differential pressure (i.e. the measurement value of the differential pressure sensor 59), and Qg is the exhaust gas flow rate.

The differential pressure change rate is defined as the increase in the converted differential pressure value per unit increase in the filter PM deposition amount (i.e. the gradient of the line in FIG. 14). The differential pressure change rate is expressed by the following equation 4:

$$Rp=dAp/dQpm \qquad \text{equation 4,}$$

where Rp is the differential pressure change rate, dAp is the increase in the converted differential pressure value during a third predetermined period, and dQpm is the increase in the filter PM deposition amount during the third predetermined period. The length of the third predetermined period is determined in advance in accordance with the interval of calculation to calculate the differential pressure change rate. The values dAp and dQpm are the increase in the converted differential pressure value and the increase in the filter PM deposition amount respectively during the same third predetermined period.

As shown in FIG. 14, as the filter PM deposition amount increases, the converted differential pressure value increases. With the SCR filter 51, deposition of PM in partition walls affects the filter differential pressure more greatly than deposition of PM on the surface of partition walls. Therefore, for the same amount of increase in the PM deposition amount, the magnitude of increase in the converted differential pressure value is larger with increase in the in-wall PM deposition amount than with increase in the surface PM deposition amount. Therefore, as shown in FIG. 14, the differential pressure change rate is larger during the in-wall PM deposition period than during the surface PM deposition period. In other words, change in the mode of PM deposition in the SCR filter 51 from in-wall PM deposition to surface PM deposition causes a decrease in the differential pressure change rate. Therefore, an identification between the in-wall PM deposition period and the surface PM deposition period can be made on the basis of the differential pressure change rate.

As described above, the mode of PM deposition in the SCR filter 51 shifts in order from the in-wall PM deposition to the surface PM deposition. It should be noted that oxidation of PM in the SCR filter can occur both inside partition walls and on the surface of partition walls. In consequence, even after the shift to the surface PM deposition, the in-wall PM deposition amount may decrease due to oxidation in some cases. If deposition of PM in the SCR filter 51 restarts, PM deposits firstly in partition walls. Then, there may be cases where the in-wall PM deposition progresses in a state in which PM remains on the surface of partition walls. Then, it is difficult to make an identification between the in-wall PM deposition period and the surface PM deposition period with high accuracy only on the basis of the time elapsed since the start of deposition of PM in the SCR filter 51 (e.g. the time elapsed from the end of filter regeneration process) or the filter PM deposition amount (i.e. the overall amount of PM deposited in the SCR filter 51). Using the differential pressure change rate as parameter enables more accurate identification between the in-wall PM deposition, period and the surface PM deposition period.

IN view of the above, the desorption quantity calculation unit 122 in this embodiment is configured to calculate the ammonia desorption quantity by the following equation 5, which is a modification of equation 2 presented above:

$$dD = \frac{AD}{K \times (\sigma_0 \times \alpha) \times \left(1 - \frac{1}{(\sigma_0 \times \alpha)} \times AD\right)}, \qquad \text{equation 5}$$

where AD is the ammonia adsorption amount in the SCR catalyst 51a, dD is the ammonia desorption quantity, $\sigma_0$ is the saturated ammonia adsorption amount of the SCR catalyst 51a, K is an equilibrium constant, and $\alpha$ is a correction coefficient.

In the calculation of the ammonia desorption quantity, the previous adsorption amount value is substituted for the ammonia adsorption amount AD in equation 5. The saturated adsorption amount $\sigma_0$ of the SCR catalyst 51a and the equilibrium constant K in the above equation 5 are determined on the basis of the filter temperature at the time when the ammonia desorption quantity is calculated. The correction coefficient $\alpha$ in the above equation 5 is determined on the basis of the differential pressure change rate Rp at the time when the ammonia desorption quantity is calculated as follows:

when Rp≥Rp0, $\alpha$=1, when Rp<Rp0, $\alpha$=$\alpha$x (>1), where Rp0 is a predetermined threshold for identification between the in-wall PM deposition period and the surface PM deposition period. Thus, if the differential pressure change rate Rp is higher than or equal to the predetermined threshold Rp0, it may be concluded that it is during the in-wall PM deposition period now. If the differential pressure change rate Rp is lower than the predetermined threshold Rp0, it may be concluded that it is during the surface PM deposition period now. The predetermined threshold Rp0 as such can be determined for example, experimentally. The value $\alpha$x of the correction coefficient $\alpha$ in the case of Rp<Rp0 is a predetermined value larger than 1. This predetermined value $\alpha$x is a fixed value that is a fixed value irrespective of the filter PM deposition amount.

The saturated adsorption amount $\sigma_0$ of the SCR catalyst 51a is corrected by the correction coefficient $\alpha$ that determined in the above-described manner. Therefore, according to the above equation 5, even if the equilibrium constant K is the same because of the same filter temperature and the previous adsorption amount value is the same, the value of the ammonia desorption quantity obtained by this calculation is smaller during the surface PM deposition period (in which $\alpha$>1) than during the in-wall PM deposition period (in which $\alpha$=1). Since the predetermined value $\alpha$x (i.e. the value of the correction coefficient $\alpha$) is a fixed value irrespective of the filter PM deposition amount, the ammonia desorption quantity calculated by this calculation is a constant value irrespective of the filter PM deposition amount, if the filter temperature and the previous adsorption amount value are the same.

Figure 15:
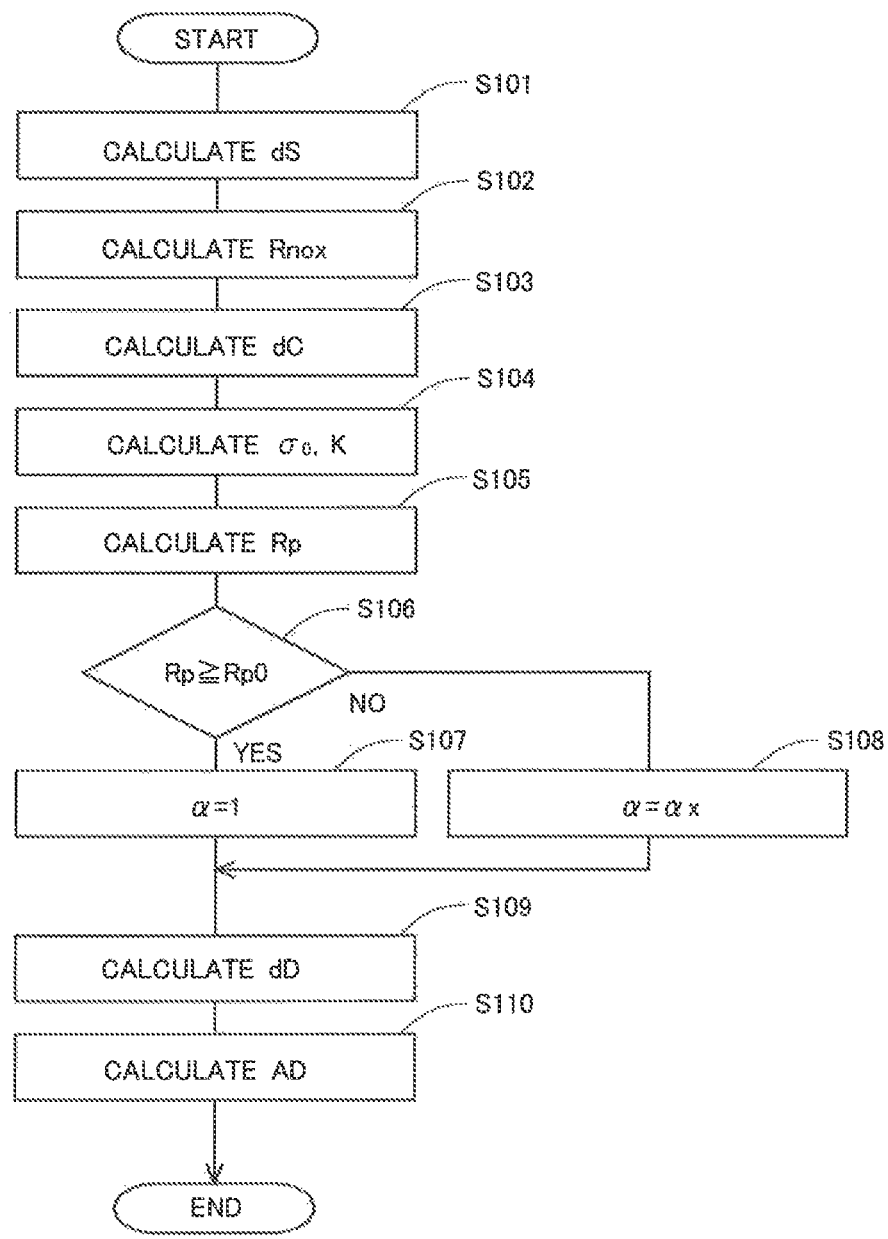
FIG. 15 is a flow chart of the calculation of the ammonia adsorption amount in the SCR catalyst supported on the SCR filter according to embodiments of the present disclosure.
Figure 16:
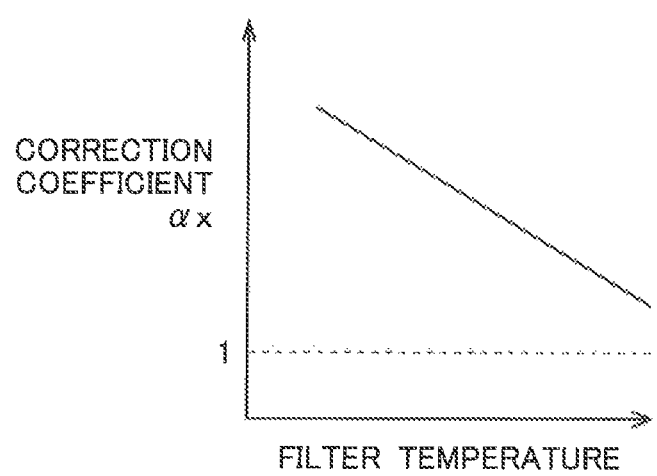
FIG. 16 is a graph showing relationship between the filter temperature and a correction coefficient α during the surface PM deposition period according to embodiments of the present disclosure.

A flow of calculation of the ammonia adsorption amount in the SCR catalyst 51a in this embodiment will be described with reference to FIG. 15. FIG. 15 is a flow chart of the calculation of the ammonia adsorption amount in the SCR catalyst 51a according to this embodiment. This flow is executed by the adsorption amount calculation unit 120 in the ECU 10 repeatedly at a predetermined calculation interval.

In this flow, firstly in step S101, the ammonia supply quantity dS is calculated from the quantity of urea solution added through the urea solution addition valve 53 over the second predetermined period (which is determined in accordance with the interval of execution of this flow). Then, in step S102, an estimated NOx removal rate Rnox with the SCR catalyst 51a is calculated from the exhaust gas flow rate, the filter temperature, and the previous adsorption amount value. Then, in step S103, the ammonia consumption quantity dC is calculated from the estimated NOx removal rate Rnox calculated in step S102 and the inflowing NOx concentration measured by the upstream NOx sensor 57. The processing of steps S102 and S103 is executed by the consumption quantity calculation unit 121, Then, in step S104, the saturated adsorption amount $\sigma_0$ of the SCR catalyst 51a and the value of the equilibrium constant K are calculated on the basis of the filter temperature. The ECU 10 has relationship between the filter temperature and the saturated adsorption amount $\sigma_0$ of the SCR catalyst 51a like that shown in FIG. 10 and relationship between the filter temperature and the equilibrium constant K like that shown in FIG. 11 as maps or functions stored therein. In step S104, the saturated adsorption amount $\sigma_0$ of the SCR catalyst 51a and the equilibrium constant K are calculated by using such maps or functions.

Then, in step S105, the differential pressure change rate Rp is calculated by the aforementioned equation 4. Then, in step S106, it is determined whether or not the differential pressure change rate Rp calculated in step S105 is equal to or larger than the predetermined threshold Rp0. If the determination made in step S106 is affirmative, it may be concluded that it is during the in-wall PM deposition period now. Then, in step S107, the correction coefficient $\alpha$, which will be used in calculation of the ammonia desorption quantity dD in step S109 described later, is set to 1. On the other hand, if the determination made in step S106 is negative, it may be concluded that it is during the surface PM deposition period now. Then, in step S108, the correction coefficient $\alpha$, which will be used in calculation of the ammonia desorption quantity dD in step S109 described later, is set to $\alpha$x.

After the processing of step S107 or S108, the processing of step S109 is executed. In step S109, the ammonia desorption quantity dD is calculated by the aforementioned equation 5. In this processing, the previous adsorption amount value is substituted for the ammonia adsorption amount AD in the aforementioned equation 5. As the values of the saturated adsorption amount $\sigma_0$ of the SCR catalyst 51a and the value of the equilibrium constant K in equation 5, the values calculated in step S104 are used. The processing of steps S105 through S109 is executed by the desorption quantity calculation unit 122.

Then, in step S110, the ammonia adsorption amount AD of this time is calculated by adding the ammonia supply quantity dS calculated in step S101 to the previous adsorption amount value and subtracting the ammonia consumption quantity dC calculated in Step S103 and the ammonia desorption quantity dD calculated in step S109 from it. The ammonia adsorption amount AD calculated in step S110 is stored in the ECU 10. This stored value of the ammonia adsorption amount AD will serve as the previous adsorption amount value in the next time calculation process.

As described above, according to this embodiment, if the filter temperature and the previous adsorption amount value remain the same, the value of the ammonia desorption quantity obtained by this calculation is smaller during the surface PM deposition period than during the in-wall PM deposition period. In consequence, the value of the ammonia adsorption amount in the SCR catalyst 51a calculated by the above-described flow is larger during the surface PM deposition period than during the in-wall PM deposition period. Thus, the ammonia adsorption amount in the SCR catalyst 51a taking account of the state of deposition of PM in the SCR filter 51 is calculated. Therefore, the ammonia adsorption amount in the SCR catalyst 51a can be estimated as accurately as possible.

On the basis of the conventional theory that increases of the PM deposition amount in an SCR filter make the ammonia adsorption amount in the SCR catalyst supported on that SCR filter more apt to increase, the calculation process may be designed in such a way as to vary the calculated value of the ammonia adsorption amount in the SCR catalyst on accordance with the surface PM deposition amount during the surface DM deposition period, specifically, to make the calculated value of the ammonia adsorption amount larger when the surface PM deposition amount is large than when it is small, if the other parameters remain the same. However, according to the findings made by the inventors of the present disclosure, increases or decreases in the surface PM deposition amount have little effect on increases or decreases in the ammonia adsorption amount in the SCR catalyst. In this embodiment, during the surface PM deposition period, the calculated value of the ammonia desorption quantity is constant irrespective of the filter PM deposition amount, if the filter temperature and the previous adsorption amount value are the same. In consequence, increases or decreases in the surface PM deposition amount during the surface PM deposition period do not affect the calculated value of the ammonia adsorption amount in the SCR catalyst 51a. Therefore, the ammonia adsorption amount in the SCR catalyst 51a during the surface PM deposition period can be estimated with improved accuracy.

In this embodiment, the ammonia desorption quantity is calculated by the desorption quantity calculation unit 122 using the aforementioned equation 5. Alternatively, a map specifying relationship between the ammonia desorption quantity with the filter temperature and the previous adsorption amount value may be stored in the ECU 10 in advance, and the ammonia desorption quantity may be calculated using the map. For example, a map to be used during the in-wall PM deposition period and a map to be used during the surface PM deposition period may be stored separately in the ECU 10. In this case, in the map to be used during the surface PM deposition period, the value of the ammonia desorption quantity is set smaller than that in the map to be used during the in-wall PM deposition period for the same filter temperature and the same previous adsorption amount value. When calculating the ammonia desorption quantity, the map to be used in the calculation is selected on the basis of whether or not the differential pressure change rate Rp is equal to or higher than the predetermined threshold Rp0. Such selective use of the map in calculation of the ammonia desorption quantity can provide the advantageous effect same as that in the case where the ammonia desorption quantity is calculated by the aforementioned equation 5.

As shown in FIG. 12, at the same filter temperature, the saturated adsorption amount of the SCR catalyst 51a is larger in the state in which PM is deposited in the SCR filter 51 than in the state in which PM is not deposited in the SCR filter 51. As described above, this change in the saturated adsorption amount of the SCR catalyst 51a is attributable not to surface PM deposition but to in-wall PM deposition. Moreover, as will be seen from FIG. 12, the lower the filter temperature is, the larger the magnitude of increase of the saturated adsorption amount of the SCR catalyst 51a attributable to in-wall PM deposition is. Therefore, even during the surface PM deposition period, in which the in-wall PM deposition amount remains constant at its upper limit, the lower the filter temperature is, the larger the magnitude of decrease of the ammonia desorption quantity attributable to in-wall PM deposition is, when the ammonia adsorption amount in the SCR catalyst 51a is the same.

In view of the above, the predetermined value αx of the correction coefficient α used in calculation of the ammonia desorption quantity dD with the aforementioned equation 5 during the surface PM deposition period may be varied taking account of the filter temperature. Specifically, the lower the filter temperature at the time when the ammonia desorption quantity is calculated is, the larger the predetermined value αx may be made. This makes calculation of the ammonia desorption quantity during the surface PM deposition period more accurate. Therefore, the accuracy of calculation of the ammonia adsorption amount in the SCR catalyst 51a during the surface PM deposition period can further be improved.

As described above, during the in-wall PM deposition period, even if the filter temperature is the same, the saturated adsorption amount of the SCR catalyst 51a varies depending on the in-wall PM deposition amount. Therefore, during the in-wall PM deposition period, even if the filter temperature and the ammonia adsorption amount in the SCR catalyst 51a remain the same, the ammonia desorption quantity varies depending on the in-wall. PM deposition amount. For this reason, in order to calculate the ammonia adsorption amount in the SCR catalyst 51a during the in-wall PM deposition period with high accuracy, it is preferred that the desorption quantity calculation unit 122 be configured to calculate the ammonia desorption quantity taking account of the in-wall PM deposition amount. However, as described before, since oxidation of PM in the SCR filter 51 can occur both in the partition walls and on the surface of the partition walls, even if the filter PM deposition amount is the same, the in-wall PM deposition amount is not necessarily the same. Moreover, even if the in-wall PM deposition amount is the same, the converted differential pressure value varies if the surface PM deposition amount varies. For this reason, it is difficult to determine the in-wall PM deposition amount during the in-wall PM deposition period accurately on the basis of the converted differential pressure value.

Therefore, in this embodiment, when calculating the ammonia desorption quantity by the desorption quantity calculation unit 122 during the in-wall PM deposition period, the effect of the in-wall PM deposition amount is not taken into account. Thus, the correction coefficient α in the aforementioned equation 5 used in calculation of the ammonia desorption quantity dD during the in-wall PM deposition period is set to 1 constantly irrespective of the filter PM deposition amount (i.e. the in-wall PM deposition amount).

In consequence, the ammonia desorption quantity calculated by the desorption quantity calculation unit 122 during the in-wall PM deposition period has a constant value, if the filter temperature and the previous adsorption amount value are the same. Therefore, there is a possibility that the value of the ammonia adsorption amount in the SCR catalyst 51a calculated by the adsorption amount calculation unit 120 during the in-wall PM deposition period may differ from the actual ammonia adsorption amount, because the effect of the in-wall PM deposition amount is not taken into account. However, duration of the in-wall PM deposition period is generally much shorter than the surface PM deposition period. Therefore, even if the estimated value of the ammonia adsorption amount in the SCR catalyst 51a during the in-wall PM deposition period differs from the actual ammonia adsorption amount to an extent attributable to the effect of the in-wall PM deposition amount, the possibility that a substantial problem arises from this difference is low.

It is not essential that the correction coefficient α in the aforementioned equation 5 used in calculation of the ammonia desorption quantity dD during the in-wall PM deposition period be a constant value. For example, an assumption that the in-wall PM deposition amount changes to some extent during the in-wall PM deposition period may be made in advance, and the correction coefficient α may be varied on the basis of that assumption. In this way, the calculated value of the ammonia desorption quantity may be varied during the in-wall PM deposition period taking account of the assumed in-wall PM deposition amount, even if the filter temperature and the previous adsorption amount value are the same.

(Urea Solution Addition Quantity Control)

Figure 17:
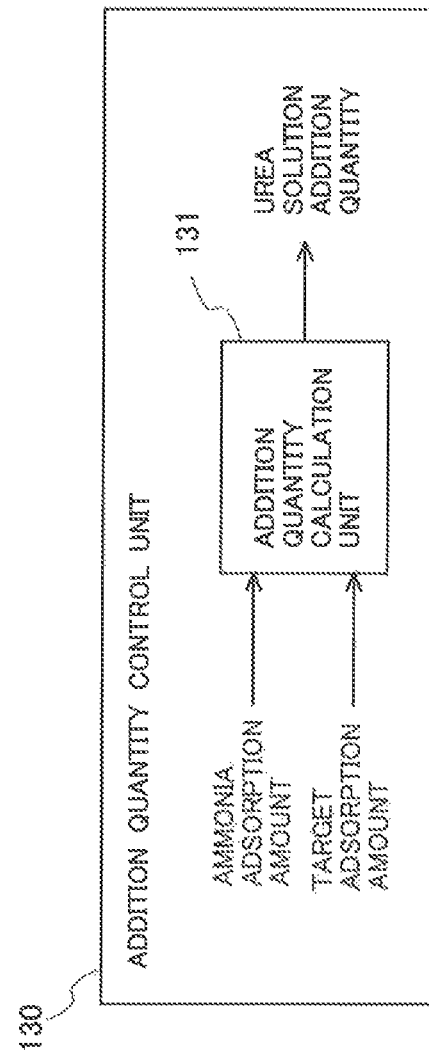
FIG. 17 is a block diagram illustrating the functions of an addition quantity control unit in the ECU according to embodiments of the present disclosure.

As described above, in this embodiment, the ECU 10 controls the quantity of urea solution added through the urea solution addition valve 53 so as to keep/adjust the ammonia adsorption amount in the SCR catalyst 51a at/to a predetermined target adsorption amount. FIG. 17 is a block diagram illustrating the functions of an addition quantity control unit in the ECU 10. The addition quantity control unit 130 is a functional unit configured to control the quantity of urea solution added through the urea solution addition valve 53. The addition quantity control unit is constituted by execution of a certain program in the ECU 10.

The addition quantity control unit 130 includes an addition quantity calculation unit 131. The addition quantity calculation unit 131 has as inputs the ammonia adsorption amount in the SCR catalyst 51a at the present time calculated by the adsorption amount calculation unit 120 and the predetermined target adsorption amount. The addition quantity calculation unit 131 is configured to calculate the quantity of urea solution to be added through the urea solution addition valve 53 from the input values of the ammonia adsorption amount in the SCR catalyst 51a and the predetermined target adsorption amount. The addition quantity control unit 130 controls the quantity of urea solution added through the urea solution addition valve 53 to make it equal to the addition quantity calculated by the addition quantity calculation unit 131. The addition quantity control unit 130 may control the urea solution addition quantity in such a way that the larger the difference between the ammonia adsorption amount in the SCR catalyst 51a at the present time and the predetermined target adsorption amount is, the larger the change in the urea solution addition quantity through the urea solution addition valve 53 from the previous urea solution addition quantity is made. Alternatively, the urea solution addition quantity through the urea solution addition valve 53 may be changed by a predetermined quantity repeatedly so that the ammonia adsorption amount in the SCR catalyst 51a approaches the predetermined target adsorption amount gradually. By controlling the urea solution addition quantity through the urea solution addition valve 53 in the above-described manner, the ammonia supply quantity is controlled in such a way as to make the ammonia adsorption amount in the SCR catalyst 51a equal to the predetermined target adsorption amount.

In this embodiment, the ammonia adsorption amount in the SCR catalyst 51a is calculated by the adsorption amount calculation unit 120 with as high accuracy as possible. Therefore, the above-described control of the ammonia supply quantity can keep/adjust the ammonia adsorption amount in the SCR catalyst at/to the predetermined target adsorption amount with as high accuracy as possible.

(Modification)

Figure 18:
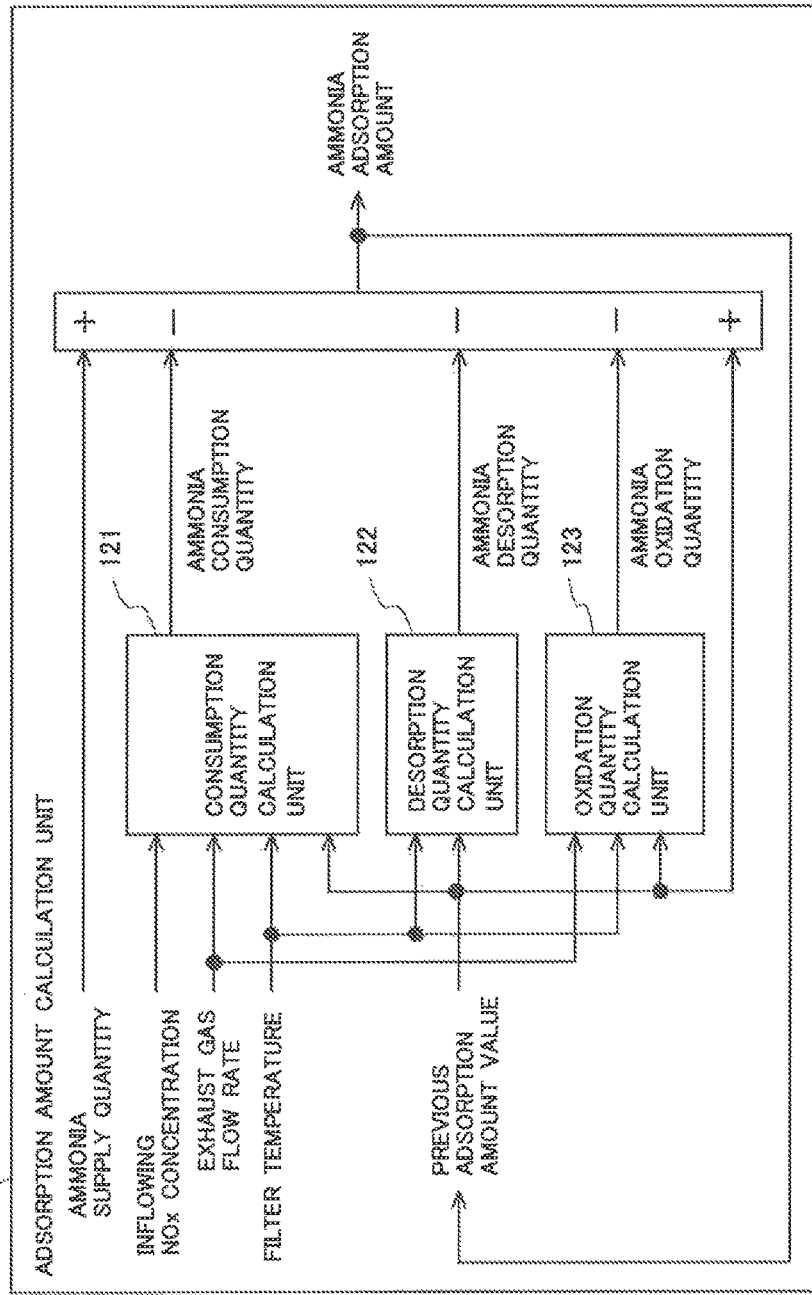
FIG. 18 is a block diagram illustrating the functions of an adsorption amount calculation unit in the ECU according to modifications of embodiments of the present disclosure.

FIG. 18 is a block diagram illustrating the functions of the adsorption amount calculation unit in the ECU 10 according to a modification of the embodiment. The adsorption amount calculation unit 120 according to the modification has an oxidation quantity calculation unit 123 in addition to the consumption quantity calculation unit 121 and the desorption quantity calculation unit 122. Ammonia supplied to the SCR filter 51 and once adsorbed in the SCR catalyst 51a is consumed in reduction of NOx or desorbed without being consumed in reduction of NOx. Besides the above, some ammonia supplied to the SCR filter 51 and once adsorbed in the SCR catalyst 51a is oxidized in the SCR catalyst 51a. In view of this, the oxidation quantity calculation unit 123 according to this modification is configured to calculate the ammonia oxidation quantity defined as the quantity of ammonia oxidized in the SCR catalyst 51a during the second predetermined period, which is determined in accordance with the interval of calculation of the ammonia adsorption amount.

The ammonia oxidation quantity correlates with the exhaust gas flow rate, the filter temperature, and the ammonia adsorption amount in the SCR catalyst 51a. Specifically, if the filter temperature and the ammonia adsorption amount in the SCR catalyst 51a remain the same, the higher the exhaust gas flow rate is, the smaller the ammonia oxidation quantity is. If the exhaust gas flow rate and the ammonia adsorption amount in the SCR catalyst 51a remain the same, the higher the filter temperature is, the larger the ammonia oxidation quantity is. If the exhaust gas flow rate and the filter temperature remain the same, the larger the ammonia adsorption amount in the SCR catalyst 51a is, the larger the ammonia oxidation quantity is.

Therefore, the oxidation quantity calculation unit 123 is configured to have as inputs the exhaust gas flow rate, the filter temperature, and the previous adsorption amount value. The oxidation quantity calculation unit 123 calculates the ammonia oxidation quantity using the above-described relationship of the ammonia oxidation quantity with the exhaust gas flow rate, the filter temperature, and the ammonia adsorption amount in the SCR catalyst 51a. The adsorption amount calculation unit 120 calculates the ammonia adsorption amount in the SCR catalyst 51a of this time by adding the ammonia supply quantity as an increase to the previous adsorption, amount value and subtracting the ammonia consumption quantity, the ammonia desorption quantity, and the ammonia oxidation quantity as decreases from it.

According to this modification, in the calculation of the ammonia adsorption amount in the SCR catalyst 51a, not only the ammonia consumption quantity and the ammonia desorption quantity but also the ammonia oxidation quantity is taken into account as a decrease. This further improves accuracy of calculation of the ammonia adsorption amount in the SCR catalyst 51a. However, the ammonia oxidation quantity is considered to be relatively small as compared to the ammonia consumption quantity and the ammonia desorption quantity. Therefore, it is not essential to take the ammonia oxidation quantity into account when estimating the ammonia adsorption amount in the SCR catalyst 51a.

In the above-described embodiment, the SCR filter 51 corresponds to the SCR filter according to the present disclosure, and the urea solution addition valve 53 corresponds to the ammonia supply device according to the present disclosure. Moreover, in the above-described embodiment, the adsorption amount calculation unit 120 corresponds to the adsorption amount calculation unit according to the present disclosure, and the desorption quantity calculation unit 122 corresponds to the desorption quantity calculation unit according to the present disclosure.

In the above-described embodiment, the processing of step S110 in the flow chart shown in FIG. 15 corresponds to the adsorption amount calculation step according to the present disclosure, and the processing of steps S105 through S109 in the flow chart shown in FIG. 15 corresponds to the desorption quantity calculation step according to the present disclosure.

This application claims the benefit of Japanese Patent Application No. 2015-230007, filed on Nov. 25, 2015, which is hereby incorporated by reference herein in its entirety.

What is claimed is:

1. An ammonia adsorption amount estimation apparatus for estimating an amount of ammonia adsorbed in an SCR catalyst in an SCR filter, which is provided in an exhaust passage of an internal combustion engine and includes a filter and said SCR catalyst supported thereon, said SCR catalyst having a capability of reducing $NO_x$ in exhaust gas by using as reducing agent ammonia supplied, by an ammonia supply device provided in said exhaust passage upstream of said SCR filter, and said filter having a function of trapping particulate matter in exhaust gas, comprising;
   an adsorption amount calculation unit configured to calculate an ammonia adsorption amount, defined as the amount of ammonia adsorbed in said SCR catalyst by integrating an ammonia supply quantity defined as the quantity of ammonia supplied to said SCR filter by said ammonia supply device, an ammonia consumption quantity defined as the quantity of ammonia consumed in reduction of $NO_x$ in said SCR catalyst, and an ammonia desorption quantity defined as the quantity of ammonia desorbed from said SCR catalyst, said adsorption amount calculation unit being configured to calculate the ammonia adsorption amount in said SCR catalyst at the present time by adding said ammonia supply quantity to a previous adsorption amount value defined as a value of the ammonia adsorption amount in said SCR catalyst calculated at a previous time and subtracting said ammonia consumption quantity and said ammonia desorption quantity from it; and
   a desorption quantity calculation unit configured to calculate said ammonia desorption quantity on the basis of a temperature of said SCR filter at the time when said ammonia desorption quantity is calculated and said previous adsorption amount value,
   wherein if the temperature of said SCR filter and said previous adsorption amount value are the same, the value of said ammonia desorption quantity calculated by said desorption quantity calculation unit is smaller when a differential pressure change rate at the time when said ammonia desorption quantity is calculated is lower than a predetermined threshold than when said differential pressure change rate is equal to or higher than said predetermined threshold, said differential pressure change rate being defined as the amount of increase in a converted differential pressure value obtained by normalizing the differential pressure of the exhaust gas across said SCR filter by an exhaust gas rate per unit increase in a filter PM deposition amount defined as the amount of particulate matter deposited in said SCR filter that is estimated on the basis of a parameter other than said converted differential pressure value.

2. An ammonia adsorption amount estimation apparatus according to claim 1, wherein when said differential pressure change rate at the time when, said ammonia desorption quantity is calculated is lower than said predetermined threshold, said desorption quantity calculation unit calculates said ammonia desorption quantity as a constant value irrespective of said-filter PM deposition amount if the temperature of said SCR filter and said previous adsorption amount value are the same.

3. An exhaust gas purification system comprising:
   said SCR filter;
   said, ammonia supply device;
   an ammonia adsorption amount estimation apparatus according to claim 1; and
   a controller comprising at least one processor configured to control said ammonia supply amount in such a way as to make the ammonia adsorption amount in said SCR catalyst estimated by said ammonia adsorption amount estimation apparatus equal to a predetermined target adsorption amount.

4. An ammonia adsorption amount estimation method for estimating an amount of ammonia adsorbed in an SCR catalyst in an SCR filter, which is provided in an exhaust passage of an internal combustion engine and includes a filter and said SCR catalyst supported thereon, said SCR catalyst having a capability of reducing $NO_x$ in exhaust gas by using as reducing agent ammonia supplied by an ammonia, supply device provided in said exhaust passage upstream of said SCR filter, and said filter having a function of trapping particulate matter in exhaust gas, including;
   an adsorption amount calculation step of calculating an ammonia adsorption amount defined as the amount of ammonia adsorbed in said SCR catalyst by integrating an ammonia supply quantity defined as the quantity of ammonia supplied to said SCR filter by said ammonia supply device, an ammonia consumption quantity defined as the quantity of ammonia consumed in redaction of $NO_x$ in said SCR catalyst, and an ammonia desorption quantity defined as the quantity of ammonia desorbed from said SCR catalyst, said adsorption amount calculation step of adding said ammonia supply quantity to a previous adsorption amount, value defined as a value of the ammonia adsorption amount in said SCR catalyst calculated at a previous time and subtracting said ammonia consumption quantity and said ammonia desorption quantity from it to calculate the ammonia adsorption amount in said SCR catalyst at the present time; and
   a desorption quantity calculation step of calculating said ammonia desorption quantity on the basis of a temperature of said SCR filter at the time when said ammonia desorption quantity is calculated and said previous adsorption amount value, wherein in said desorption quantity calculation step, the calculated value of said ammonia, desorption quantity is smaller when a differential pressure change rate at the time when said ammonia desorption quantity is calculated is lower than a predetermined threshold than when said differential pressure change rate is equal to or higher than said predetermined threshold if a temperature of said SCR filter and said previous adsorption amount value are the same, said differential pressure change rate being defined as the amount of increase in a converted differential pressure value obtained by normalizing the differential pressure of the exhaust gas across said SCR filter by an exhaust gas rate per unit increase in a filter PM deposition amount defined as the amount of particulate matter deposited in said SCR filter that is estimated on the basis of a parameter other than said converted differential pressure value.

* * * * *